(12) United States Patent
Honjo et al.

(10) Patent No.: US 9,519,202 B2
(45) Date of Patent: Dec. 13, 2016

(54) AUTO-FOCUSING DEVICE AND IMAGE PICKUP DEVICE

(71) Applicant: Panasonic Corporation, Osaka (JP)

(72) Inventors: Kenichi Honjo, Osaka (JP); Mitsuyoshi Okamoto, Osaka (JP); Koji Shibuno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 104 days.

(21) Appl. No.: 14/483,770

(22) Filed: Sep. 11, 2014

(65) Prior Publication Data

US 2014/0375872 A1 Dec. 25, 2014

Related U.S. Application Data

(63) Continuation of application No. PCT/JP2013/001787, filed on Mar. 15, 2013.

(30) Foreign Application Priority Data

Mar. 15, 2012 (JP) .................. 2012-058289
Mar. 22, 2012 (JP) .................. 2012-065005

(51) Int. Cl.
*G03B 13/36* (2006.01)
*H04N 5/232* (2006.01)
(Continued)

(52) U.S. Cl.
CPC ................. *G03B 13/36* (2013.01); *G02B 7/36* (2013.01); *G03B 3/10* (2013.01); *H04N 5/23212* (2013.01); *H04N 5/23219* (2013.01)

(58) Field of Classification Search
CPC .. G03B 13/32–13/36; G03B 3/10; G02B 7/28; G02B 7/282; G02B 7/36–7/68; H04N 5/23212; H04N 5/23219
See application file for complete search history.

(56) References Cited

U.S. PATENT DOCUMENTS 5,448,329 A 9/1995 Nakata
2008/0284900 A1 11/2008 Abe

FOREIGN PATENT DOCUMENTS

JP 05-142463 A 6/1993
JP 2005-164669 A 6/2005
(Continued)

OTHER PUBLICATIONS

International Preliminary Report on Patentability for corresponding International Application No. PCT/JP2013/001787(English Translation), dated Sep. 25, 2014.
(Continued)

*Primary Examiner* — Paul Berardesca
(74) *Attorney, Agent, or Firm* — Renner, Otto, Boisselle & Sklar, LLP

(57) ABSTRACT

An auto-focusing device including: an imaging unit which generates image data of a subject image; an optical system which includes a focus lens; a lens driver which drives the focus lens; a lens position detector which detects a position of the focus lens; a region detector which detects a predetermined region of the subject image; an evaluation value calculating unit which calculates an AF evaluation value; a movement determining unit which determines whether a subject is moving closer or away based on whether the predetermined region has been enlarged or reduced from the region before; and a lens controller which controls the lens driver, wherein the lens controller controls a moving direction and a moving speed of the focus lens in an autofocus operation based on a determination result of the movement
(Continued)

determining unit, the AF evaluation value, and a position detection result for the focus lens.

13 Claims, 27 Drawing Sheets

(51) Int. Cl.
  *G03B 3/10* (2006.01)
  *G02B 7/36* (2006.01)

(56) References Cited

FOREIGN PATENT DOCUMENTS

| JP | 2005-345948 A | 12/2005 |
| JP | 2008-052225 A | 3/2008 |
| JP | 2008-276214 A | 11/2008 |
| JP | 2010-107711 A | 5/2010 |
| JP | 2010-152162 A | 7/2010 |
| JP | 2011-154148 A | 8/2011 |

OTHER PUBLICATIONS

International Search Report for corresponding International Application No. PCT/JP2013/001787 mailed Jun. 18, 2013 and English translation.

Nagahashi et al., "Iterated Graph Cuts by Multi-level Smoothing for Image Segementation", MIRU 2007, pp. 241-248, and English Abstract.

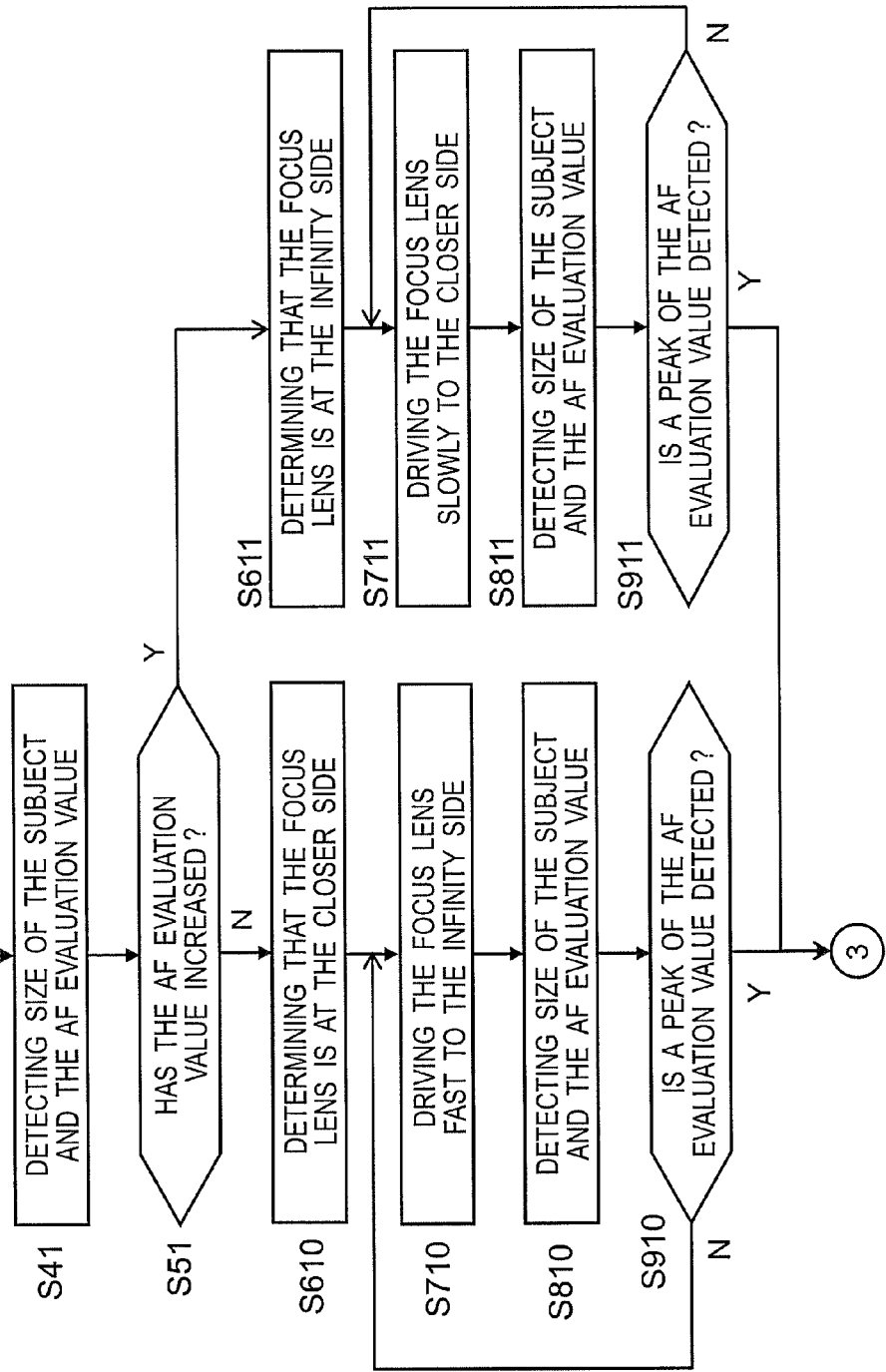

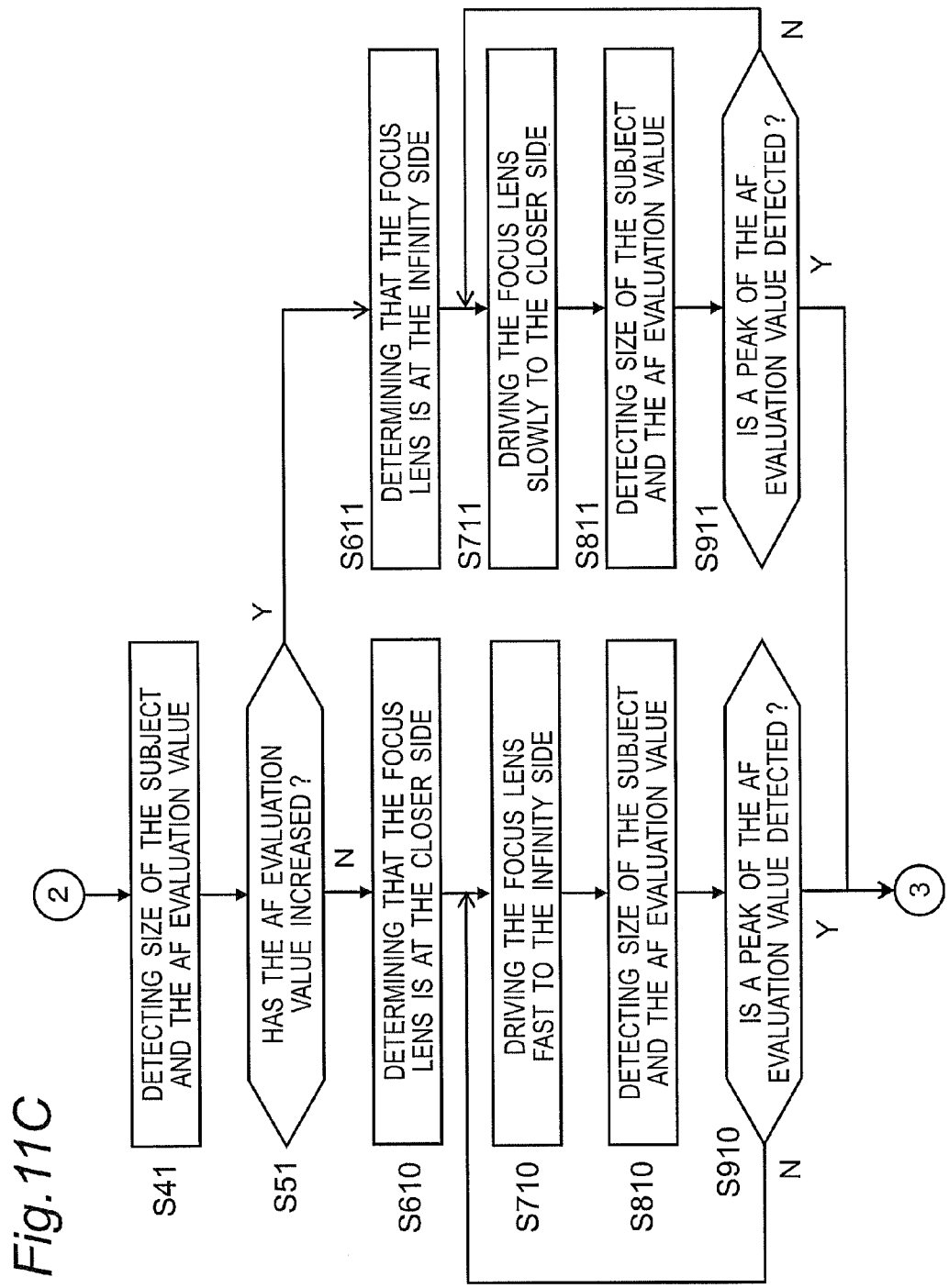

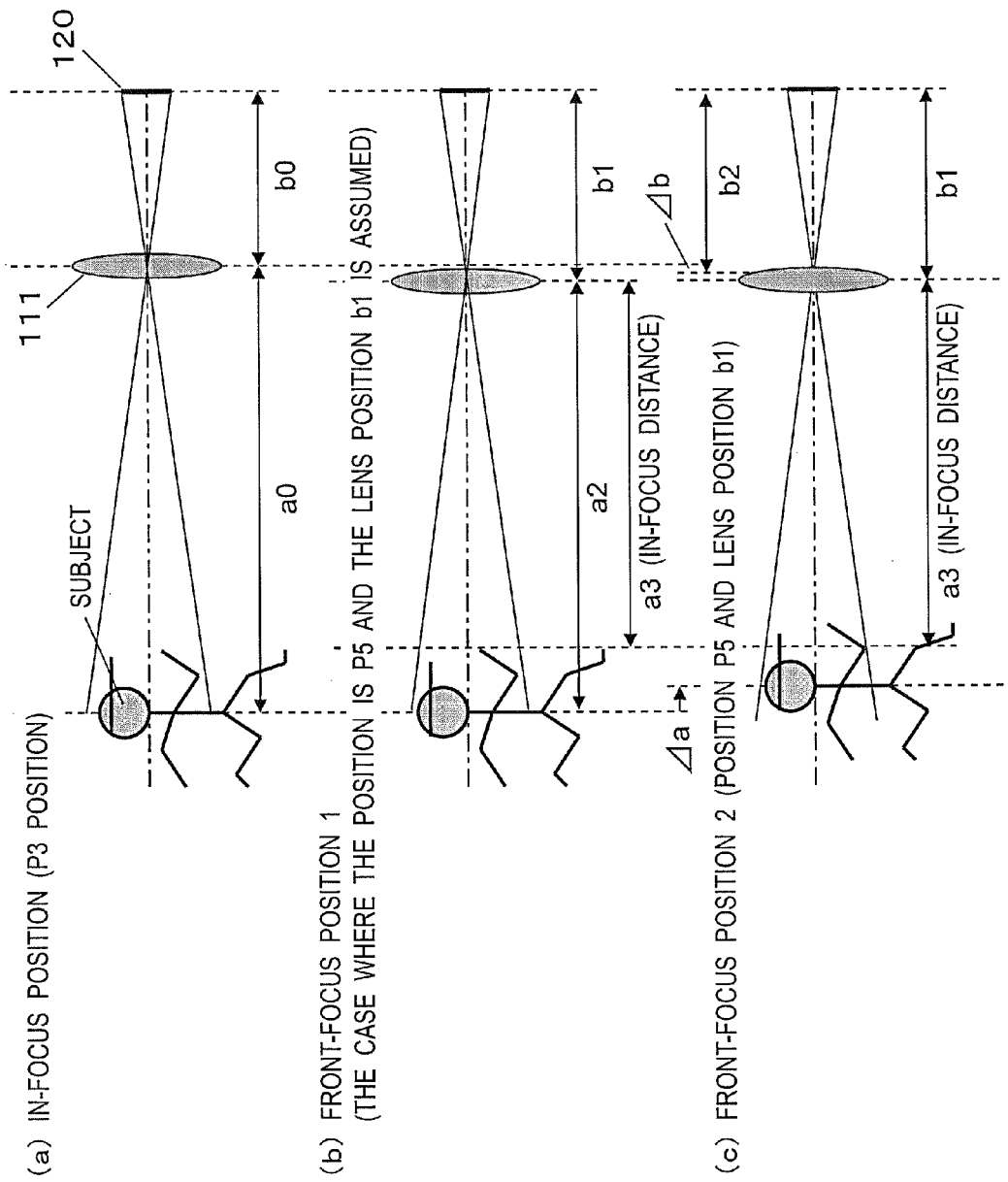

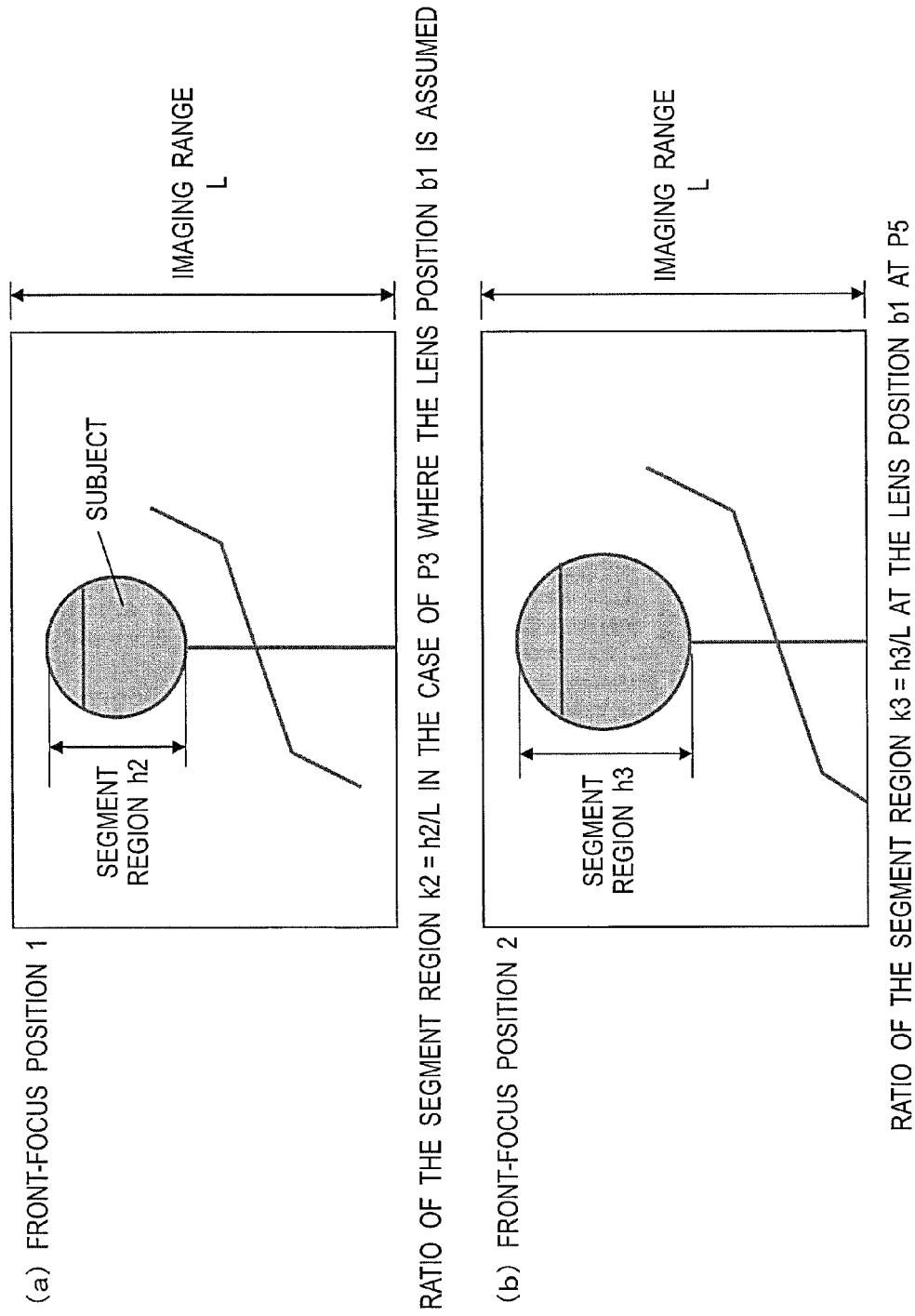

AUTO-FOCUSING DEVICE AND IMAGE PICKUP DEVICE

CROSS-REFERENCE TO RELATED APPLICATIONS

This is a continuation application of International Application No. PCT/JP2013/001787, with an international filing date of Mar. 15, 2013, which claims priority of Japanese Patent Application No. 2012-058289 filed on Mar. 15, 2012, and priority of Japanese Patent Application No. 2012-065005 filed on Mar. 22, 2012, the contents of which are incorporated herein by reference.

BACKGROUND

1. Technical Field

The present disclosure relates to an auto-focusing device and an image pickup device equipped with the auto-focusing device.

2. Related Art

Digital cameras equipped with auto-focusing devices which automatically put subjects in focus are popularized today. In a case where users of these digital cameras are making autofocus (hereinafter, also written as "AF") functions of the cameras operate to focus on desired subjects, it is difficult for the cameras to focus on subjects moving toward or away from the cameras.

JP 2010-152162 A (Patent Document 1) discloses a digital camera capable of easily focusing on a subject moving toward the camera. The digital camera detects a subject in a captured image and determines whether the subject is moving toward the camera based on the detection result. In the case where the digital camera has determined that the subject is moving toward the camera, the camera increases a unit drive quantity of its focus lens in a minute driving operation for detecting a focusing direction to a bigger quantity than that would be adopted in the case where the camera has not determined that the subject is moving toward the camera.

SUMMARY

The digital camera described in Patent Document 1 can facilitate focusing on a subject moving toward the digital camera by increasing the unit drive quantity of the focus lens for a subject moving toward the digital camera. However, it is difficult for the digital camera to ensure accuracy of in-focus state for a subject which is making such movements as going away from the digital camera.

The present disclosure is aimed to provide an auto-focusing device which is capable of ensuring focusing accuracy, thus, enables satisfactory image taking even in the case where a subject is moving toward or away from the camera when activating an autofocus operation and an image pickup device equipped with the auto-focusing device.

The auto-focusing device according to the present disclosure includes: an imaging unit configured to generate image data by capturing a subject image formed on an imaging plane; an optical system which includes a focus lens and is configured to form the subject image on the imaging plane; a lens driver configured to drive the focus lens along an optical axis direction; a lens position detector configured to detect a position of the focus lens; a region detector configured to detect a predetermined region of the subject image in the image data; an evaluation value calculating unit configured to calculate an AF evaluation value from the image data; a movement determining unit configured to determine whether a subject is moving closer or away based on whether the predetermined region detected by the region detector has been enlarged or reduced from the predetermined region detected before; and a lens controller configured to control the lens driver. The lens controller controls a moving direction and a moving speed of the focus lens in an autofocus operation based on a determination result provided from the movement determining unit, the AF evaluation value provided by the evaluation value calculating unit, and the position detection result for the focus lens provided by the lens position detector.

An image pickup device according to the present disclosure has the above described auto-focusing device.

According to the present disclosure, an auto-focusing device which is capable of ensuring focusing accuracy, thus, enables the user to perform satisfactory image taking even in a case where a subject is moving toward or away from the camera and an image pickup device equipped with the auto-focusing device are provided.

Additional benefits and advantages of embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 4C is a flow chart of the moving subject tracking AF operation in the first embodiment.

FIG. 11C is a flow chart of the moving subject tracking AF operation in the second embodiment.

FIGS. 20(a) to 20(c) are explanatory diagrams of a computational algorithm for a focus position of the moving subject tracking AF in the second embodiment.

FIGS. 21(a) and 21(b) are principle diagrams of segment range detection of the moving subject tracking AF operation in the second embodiment.

DETAILED DESCRIPTION

Embodiments will be described below in detail with reference to the drawings as required. However, unnecessarily detailed description may be omitted. For example, detailed description of already well-known matters and repetition of substantially the same configuration may be omitted. All of such omissions are intended to facilitate understanding by those skilled in the art by preventing the following description from becoming unnecessarily redundant.

The inventor(s) provide the attached drawings and the following description for those skilled in the art to fully understand the present disclosure and do not intend to limit the subject described in the claims by the attached drawings and the following description.

1. First Embodiment

An auto-focusing device to be described below is capable of ensuring focusing accuracy, thus, enables the user to perform satisfactory image taking even in a case where a subject is moving toward or away from the camera. A case where a digital camera is equipped with the auto-focusing device will be described below as an embodiment.

(1-1. Configuration)

An electrical configuration and a rear structure of the digital camera according to the embodiment will be described below with reference to the drawings.

(1-1-1. Electrical Configuration of the Digital Camera)

Figure 1:
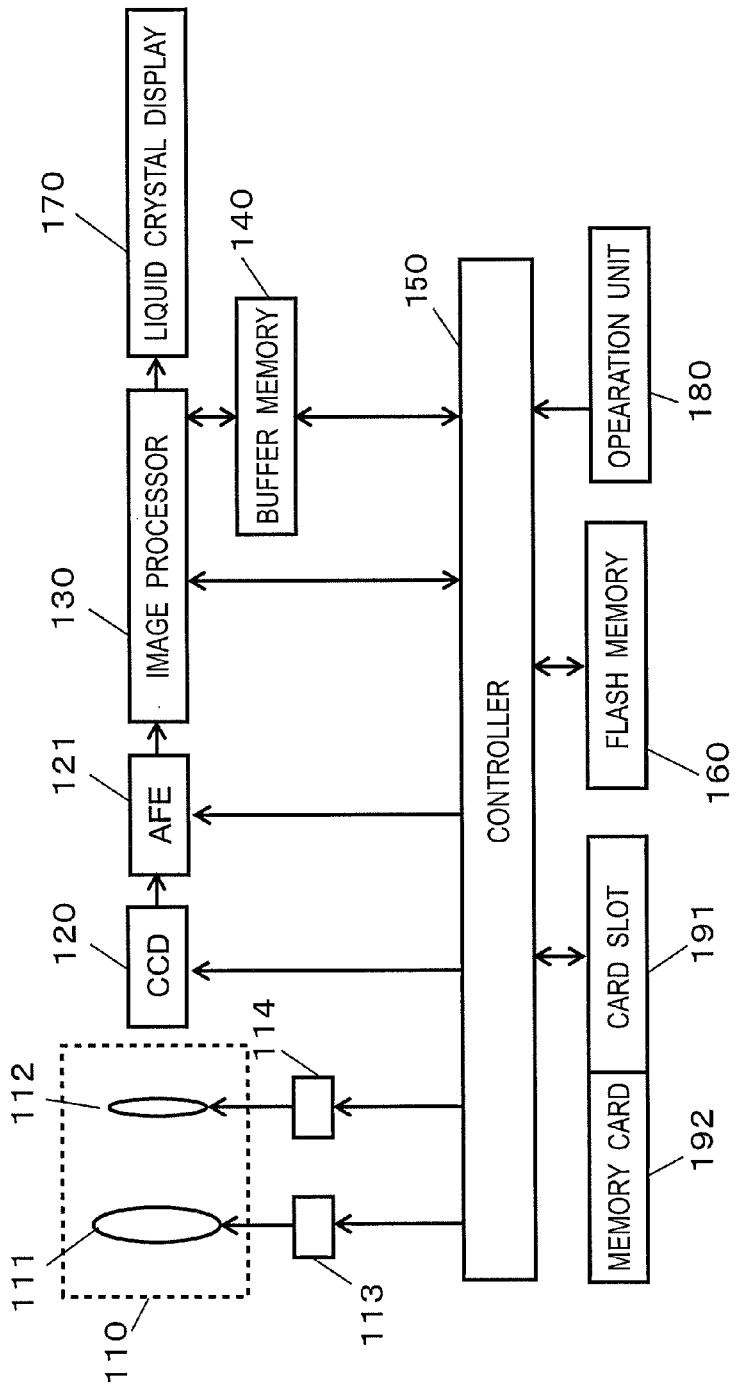
FIG. 1 is a schematic electrical diagram of a digital camera in first and second embodiments.

The electrical configuration of the digital camera according to the embodiment will be described with reference to FIG. 1.

A digital camera 100 captures a subject image formed through an optical system 110 by a CCD image sensor 120. The CCD image sensor 120 captures the subject image formed on an imaging plane and generates image data. The image data generated by the capturing is subjected to various types of processing in a preprocessing unit (AFE: Analog Front End) 121 and an image processor 130. The image data is stored in a flash memory 160 or a memory card 192. The image data stored in the flash memory 160 or the memory card 192 is displayed for reproduction on a liquid crystal display (LCD) 170 in response to reception of a user's operation on an operation unit 180.

A controller 150 performs integrated control for the operations of the entire digital camera 100. The controller 150 is constituted of components such as a ROM which stores information including a program and a CPU which processes information including a program. The ROM stores not only programs related to autofocus control including single AF control, continuous AF control, and moving subject tracking AF but also programs for performing integrated control for the operations of the entire digital camera 100. In this embodiment, operations related to the moving subject tracking AF will be detailed later. The operations related to the moving subject tracking AF may be applied to single AF and continuous AF. The ROM is not required to be provided inside the controller 150 and may be provided outside the controller 150. The controller 150 may be made of a hardwired electronic circuit or may be made of a microcomputer or the like. The controller 150 may also be made into a single semiconductor chip together with the image processor 130 and the like.

The optical system 110 includes a focus lens 111 and a zoom lens 112. Although not shown, the optical system 110 may include an optical camera shake correction (OIS: Optical Image Stabilizer) lens. The optical system 110 may include any number of various lenses or any number of various lens groups.

The focus lens 111 is used for adjusting a focal length. A focus lens motor 113 drives the focus lens 111 along an optical axis direction according to control signals sent from the controller 150. The control signals for driving the focus lens 111 include a control signal for offsetting a change in a focusing state of the subject image due to movement of the zoom lens 112 and a control signal for the moving subject tracking AF to be described later. When the focus lens motor 113 receives a control signal indicating it to fix the position of the focus lens 111 from the controller 150, it fixes the focus lens 111 to the position. Since the controller 150 recognizes the positions of the focus lens 111 and the zoom lens 112 as described above, the controller 150 functions as lens position detecting means, however, a device configured to detect positions of the lenses may be provided for the digital camera 100 separately.

The zoom lens 112 is used for adjusting a magnification/reduction rate. A zoom lens motor 114 drives the zoom lens 112 along the optical axis direction according to a control signal sent from the controller 150. The control signal for driving the zoom lens 112 is generated by the controller 150 according to a user's operation on the operation unit 180. Incidentally, the present embodiments may be configured to move the zoom lens 112 along the optical axis direction according to a user's manual operation instead of including the zoom lens motor 114 as an essential constituent element.

The CCD image sensor 120 converts light collected through the optical system 110 into an electric signal. The CCD image sensor 120 has many photodiodes in a two-dimensional array on its light-receiving surfaces. The light from the subject passes through the optical system 110 and forms an image on the light-receiving surfaces of the CCD image sensor 120. The light-receiving surfaces convert the light from the subject into electric charges by using the photoelectric effect and store the charges. The charge stored in each light-receiving surface is transferred to an amplifier (not shown) by vertical CCDs and horizontal CCDs so that image signals are generated. The CCD image sensor 120 generates a new frame of image data at every certain time. In the present embodiments, another image pickup device such as a CMOS image sensor or an NMOS image sensor may be used in place of the CCD image sensor 120.

The AFE 121 performs processing such as correlated double sampling and gain adjustment on the image signals generated by the CCD image sensor 120. Further, the AFE 121 converts analog image data into digital image data. Then, the AFE 121 outputs the image data to the image processor 130.

The image processor 130 performs various types of processing on the image data. The various types of processing include, but not limited to, gamma correction, white balance correction, YC conversion process, electronic zoom process, compression process, and expansion process. Some of these types of processing may be omitted. The image processor 130 may be made of a hardwired electronic circuit or a microcomputer or the like which uses a program. The image processor 122 may also be made into a single semiconductor chip together with the controller 150 and the like.

A buffer memory 140 is storage means that functions as a work memory for the image processor 130, the controller 150, and the like. The buffer memory 140 can be implemented by a DRAM (Dynamic Random Access Memory) or the like.

The flash memory 160 functions as an internal memory for storing image data and the like. The controller 150 stores the image data to be processed by the image processor 130 in the flash memory 160 or the memory card 192.

The card slot 191 is connection means that allows the memory card 192 to be attached and detached. The card slot 191 allows the memory card 192 to be electrically and mechanically connected. The card slot 191 may have a function of controlling the memory card 192.

The memory card 192 is an external memory that contains a storage unit such as a flash memory. The memory card 192 is capable of storing data such as the image data to be processed in the image processor 130. Although the memory card 192 is described as an example of external memory in this embodiment, the present embodiments is not limited to that. For example, a storage medium such as an optical disc may be used as the external memory.

The liquid crystal display 170 displays an image based on the image data processed in the image processor 130. The liquid crystal display 170 displays such images as a through image and a stored image. The through image is an image successively presenting new frames of image which are generated by the CCD image sensor 120 at certain time intervals. By viewing the through image displayed on the liquid crystal display 170, the user can take an image while confirming the composition of the subject. The stored image is the image stored in the memory card 192 or the flash memory 160. The liquid crystal display 170 displays an image based on already stored image data according to a user's operation. The liquid crystal display 170 can display setting conditions and the like of the digital camera 100 other than the images. The present embodiment is not limited to liquid crystal systems, plasma systems, and organic electroluminescence systems and any display which can display image data can be applied to the present embodiment.

The operation unit 180 includes units in the form of button and sliding units provided on the outer surface of the digital camera 100 and units in the form of touch panel for the user to operate by touching the liquid crystal display 170. Details of the operation unit 180 will be described in the next section. In response to reception of a user's operation on the operation unit 180, the digital camera 100 performs the respective operations.

(1-1-2. Configurations of the Rear and the Top of the Digital Camera)

Figure 2:
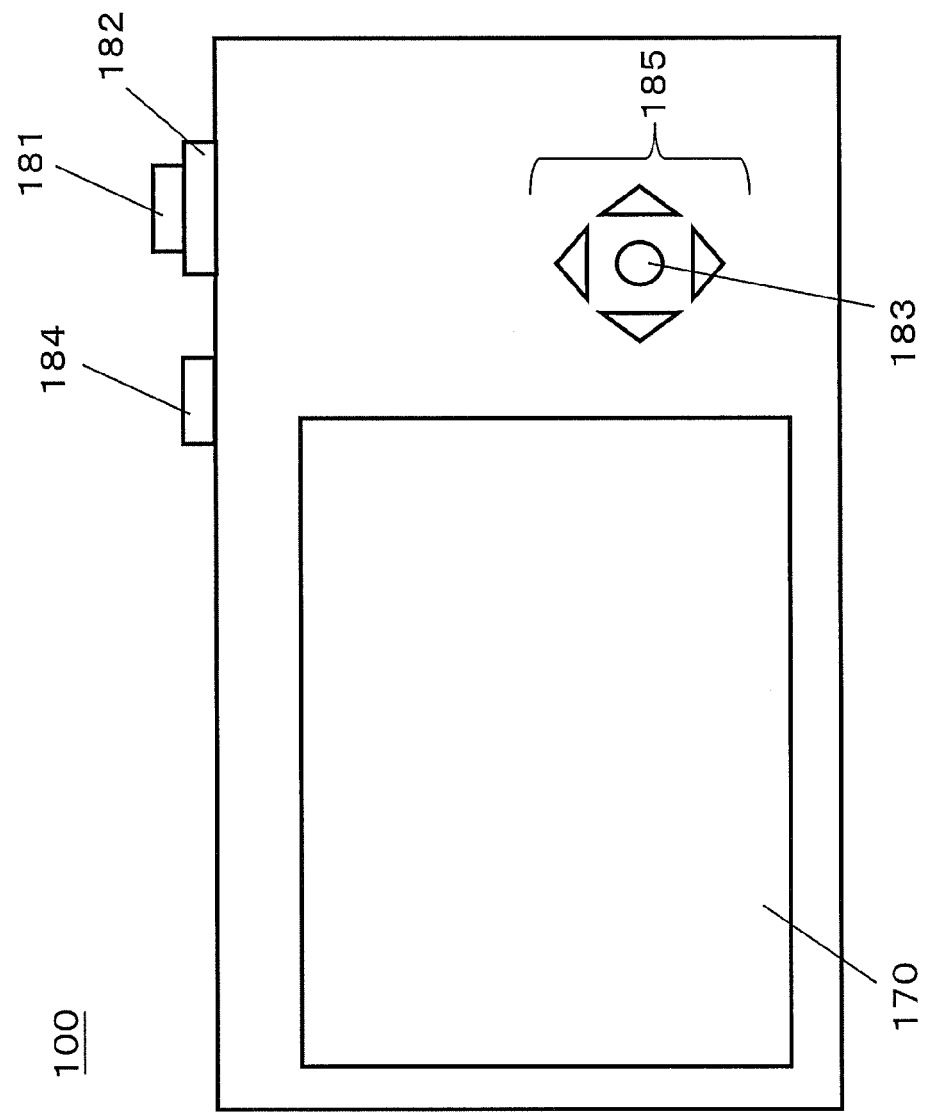
FIG. 2 is a schematic diagram of the rear and the top of the digital camera in the first and second embodiments.

The configurations of the rear and the top of the digital camera 100 according to the embodiment will be described with reference to FIG. 2.

A power switch 184, a release button 181, a zoom dial 182, directional buttons 185, a center button 183, and the like are provided on the rear and the top of the digital camera 100. They correspond to the operation unit 180 of FIG. 1.

The power switch 184 is for switching the power supply state of the digital camera 100 between ON and OFF. When the power switch 184 is turned ON, power is supplied to the digital camera 100.

The release button 181 is a two-stage push button. Hereinafter, first-stage pressing on the release button 181 will be referred to as "half-pressing" and second-stage pressing on the release button 181 will be referred to as "full-pressing". In response to user's half-pressing on the release button 181, the controller 150 performs autofocus control for focusing the lens on the subject. When the subject has come into focus, the controller 150 controls the focus lens motor 113 to fix the position of the focus lens 111 as required. In response to user's full-pressing on the release button 181, the controller 150 stores the image data captured at the moment of the full-pressing in the memory card 192 or the like.

The zoom dial 182 enables adjustment of a magnification/reduction rate to enable a wide-angle picture of the subject to be taken or a telephoto picture of the subject to be taken. According to a user's operation on the zoom dial 182, the controller 150 generates a control signal for driving the zoom lens 112.

The directional buttons 185 include an UP button, a RIGHT button, a DOWN button, and a LEFT button. In response to pressing on one of the directional buttons 185, such an operation as changing of a selected item indicated by a cursor displayed on the liquid crystal display 170 in a direction corresponding to the pressed button is performed. The center button 183 is a push button for the user to enter the selected item indicated by the cursor displayed on the liquid crystal display 170.

(1-1-3. Correspondence of Terms)

The focus lens 111 is an example of the focus lens. The configuration including the focus lens motor 113 and the controller 150 is an example of the lens driver. The controller 150 is an example of the lens position detector, the region detector, the evaluation value calculating unit, the movement determining unit, and the lens controller. The configuration including the focus lens 111, the focus lens motor 113, and the controller 150 is an example of the auto-focusing device. The digital camera 100 is an example of the image pickup device.

(1-2. Operations)

Respective operations of the digital camera 100 according to the embodiment will be described below with reference to the drawings.

(1-2-1. Autofocus Control Operation)

The digital camera 100 according to the embodiment performs autofocus control operations including the single AF control operation, the continuous AF control operation, face detection AF control operation, and the moving subject tracking AF control operation.

The autofocus control is performed on the basis of the AF evaluation value calculated each time the image data is generated. The AF evaluation value is obtained as a result of integrating high-frequency components of the brightness signals in the image data. The AF evaluation value is also referred to as a contrast value. The controller 150 determines the direction to move the focus lens 111 and the in-focus state of the subject image by comparing the AF evaluation values calculated for a plurality of focus lens positions.

In this embodiment, the controller 150 computes a relative size of a target region on the liquid crystal display 170 based on an image processing technique called segmentation as an example. Specifically, the controller 150 performs the segmentation on a head region or a face region of a person taken as the target region to extract the head region or the face region of the person, so that it can compute the relative size of the target region on the liquid crystal display 170. The segmentation is known as one of the techniques of extracting a target region from an image as described in a paper entitled "Iterated Graph Cuts by Multi-level Smoothing for Image Segmentation" in "Meeting on Image Recognition and Understanding (MIRU 2007)".

Figure 3:
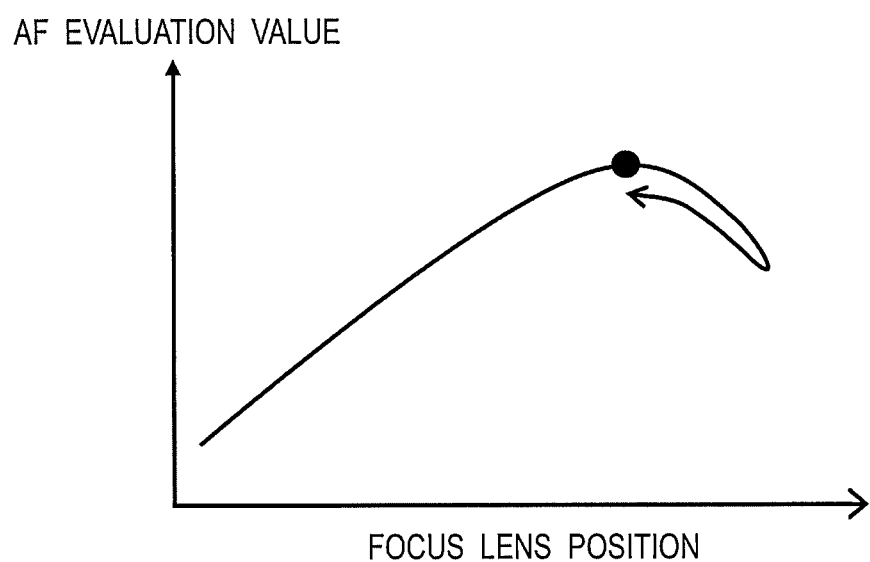
FIG. 3 is a diagram illustrating a basic operation of single AF control.

First, the single AF control operation will be described. FIG. 3 is a diagram illustrating a basic operation of single AF control. In the single AF control, the focus lens motor 113 keeps driving the focus lens 111 in a single direction from the infinity end or the closest end. The controller 150 keeps periodically calculating the AF evaluation value according to the driving of the focus lens 111. The focus lens motor 113 keeps driving the focus lens 111 in a single direction as far as the AF evaluation value increases. When the AF evaluation value stops increasing and starts decreasing, the controller 150 determines that the focus lens 111 has passed the focus position. Subsequently, the focus lens motor 113 drives the focus lens 111 in the reverse direction to move the focus lens 111 to a position at which the AF evaluation value reaches the highest value, i.e., the focus position. In response to the user's half-press operation on the release button 181, the controller 150 performs the single AF control operation. When the focus lens 111 has moved to the focus position after the single AF control operation, the controller 150 fixes the focus lens 111 to the position.

(1-2-2. Basic Principle of the Moving Subject Tracking AF Control)

The moving subject tracking AF control operation in the first embodiment will be described. The moving subject tracking AF control operation is a control operation for tracking subject movement and keeping adjustment of the focus lens 111 to make the focus lens 111 keep focused on the subject the movement of which has been tracked. The user can set a subject in the image the movement of which is to be tracked. The moving subject tracking AF control operation of the embodiment is configured to start in response to the user's half-pressing on the release button 181 as an example. This operation mode is controlled and recognized by the controller 150. Incidentally, the moving subject tracking AF control operation may be always kept active so that the moving subject tracking AF control operation is in action before the user half-presses the release button 181.

Figure 9:
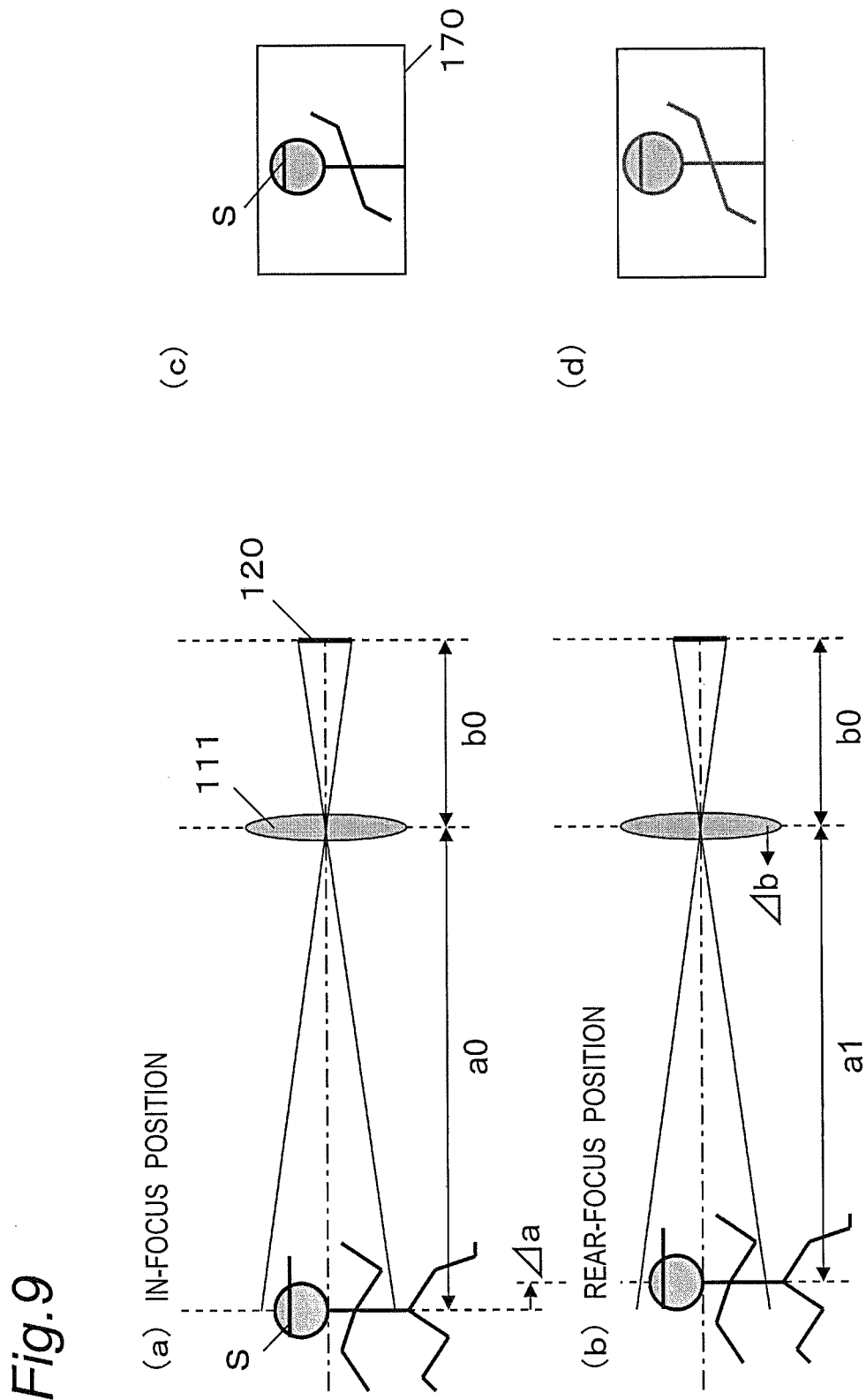
FIGS. 9(a) to 9(d) are explanatory diagrams of a computational algorithm for a focus position of the moving subject tracking AF in the first embodiment.

A basic principle of the moving subject tracking AF control will be described with reference to FIGS. 9(*a*) to 9(*d*) before description of the first embodiment. FIGS. 9(*a*) to 9(*d*) are diagrams for describing a computational algorithm for a focus position of the moving subject tracking AF control in the first embodiment. FIGS. 9(*a*) to 9(*d*) schematically illustrate a subject S, the focus lens 111, and the CCD image sensor 120. In a case where the subject S is moving toward the camera, a state illustrated in FIG. 9(*a*) changes to a state illustrated in FIG. 9(*b*). Each of FIGS. 9(*c*) and 9(*d*) illustrates the subject S displayed on the liquid crystal display 170 in each of the illustrated states, also illustrating the focusing state of the subject S. It is assumed that a transition time period T [s] is a time period spent from the state of FIG. 9(*a*) to the state of FIG. 9(*b*).

For more specific description of the principle, specific values given in the conditions below (1) to (4) will be used:

Condition (1) The lens used here has the focal length f=150 mm and the aperture value F=5.6.

Meanwhile, since it is assumed that the zoom lens 112 is not operated, the condition of the zoom lens 112 is omitted.

Condition (2) The vertical size of the CCD image sensor 120 is 13 mm.

Condition (3) The subject is captured in a range of 1 m from the top to the bottom.

Condition (4) The subject is moving toward the digital camera 100 at 7 m/s.

Assuming that a distance a0 is from the subject to the focus lens 111 and a distance b0 is from the focus lens 111 to the CCD image sensor 120 under the above described conditions, the formula below holds.

$$a0:b0=1000:13$$

From the focal length f=150 [mm] and a general equation $1/f=1/a0+1/b0$, the expressions below can be calculated.

$$a0=f\cdot(1+1000/13)=11688 \text{ [mm]}$$

$$b0=151.95 \text{ [mm]}$$

Assuming that T=1/30 [sec] here, the expressions below can be calculated.

$$\Delta a=7000/30=233.3 \text{ [mm]}$$

$$\Delta b=-(b0^2/a0^2)\cdot\Delta a$$

Because $\Delta(1/b0)=\Delta(1/f-1/a0)$

Consequently, the expression below can be calculated.

$$\Delta b=39.4 \text{ [µm]}$$

Therefore, on the condition that the focus lens 111 is driven at a rate of 39.4 [µm] per 1/30 [sec] for the subject moving toward the camera at 7 m/sec, the subject can be kept in focus. Assuming that the unit amount of movement of the focus lens 111 along the optical axis direction is almost equal to the amount of movement of the focus position (the amount of movement of the imaging plane) to the CCD image sensor 120 here, the amount of movement of the imaging plane in 1/30 [sec] is equivalent to 0.42 [Fδ] (on the condition δ=16.7 [µm]). It is assumed that the above described unit amount of movement P which is the amount of movement of the imaging plane in 1/30 [sec] is P=0.42 [Fδ] as an example below.

(1-2-3. Moving Subject Tracking AF Control Operation in the First Embodiment)

The moving subject tracking AF control operation in the first embodiment will be described with reference to FIGS. 4A to 4D and 5 to 8. FIGS. 4A to 4D are flow charts showing operations of the controller 150 in the moving subject tracking AF control operation in the first embodiment.

FIGS. 5(a) to 5(f) are diagrams for describing the operation principle of the moving subject tracking AF in the first embodiment (Subject: moving toward the camera, Initial Position: focus position). In FIGS. 5(a) to 5(f), it is assumed that the subject is moving toward the camera and in the in-focus state at the beginning of the AF operation and the focus lens 111 is at the infinite distance side of the peak of the AF evaluation value. FIGS. 5(a) to 5(c) illustrate a situation of the subject S moving toward the digital camera 100 in the order of FIG. 5(a), FIG. 5(b), and FIG. 5(c). As a result of extraction of the head of the subject S by the segmentation, the size of the subject S can be detected.

Figure 6:
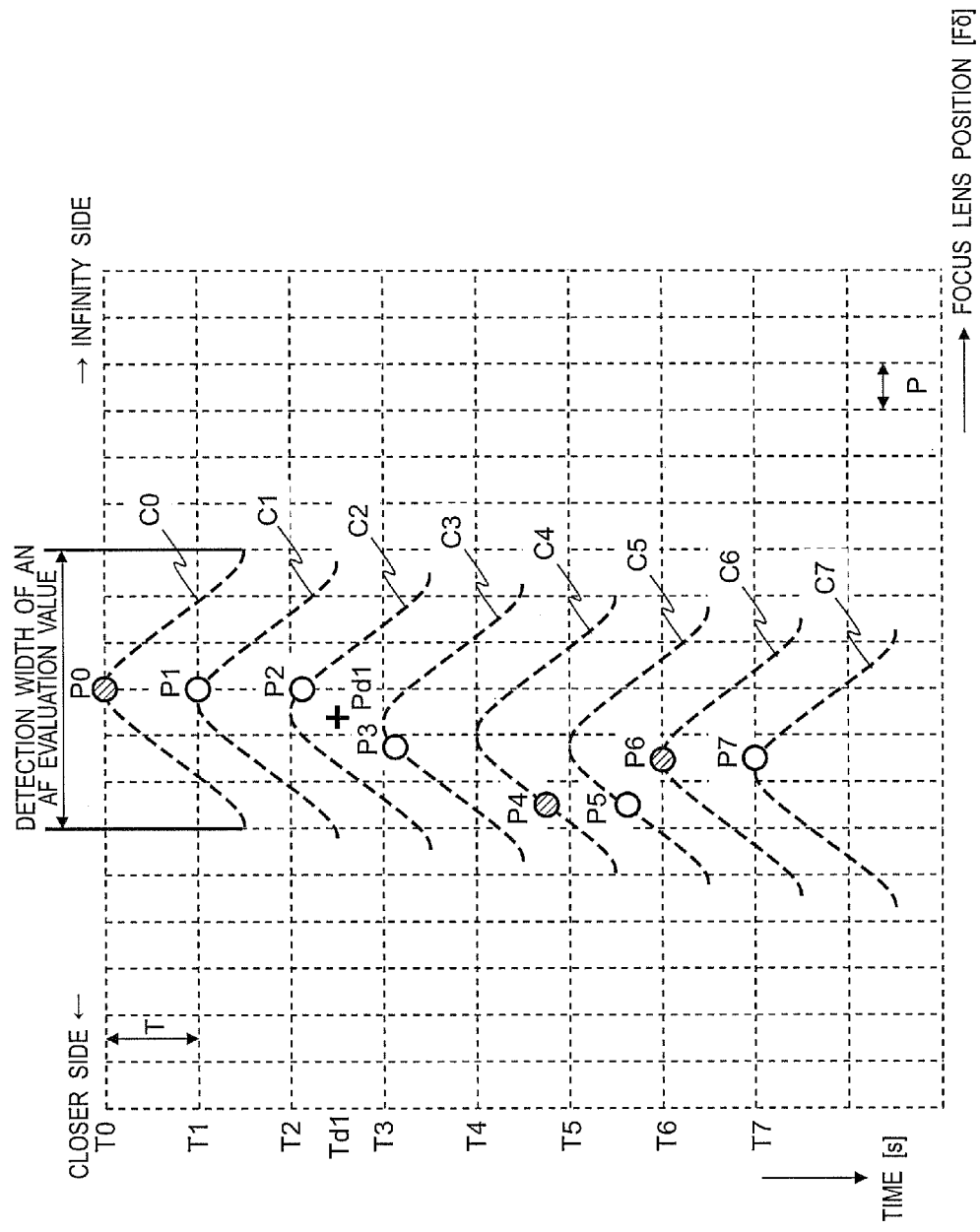
FIG. 6 is an explanatory diagram of the moving subject tracking AF operation in the first embodiment (Subject: moving toward the camera, Initial Position: focus position).

FIG. 6 is a diagram for describing the operation of the moving subject tracking AF in the first embodiment corresponding to FIGS. 5(a) to 5(f) (Subject: moving toward the camera, Initial Position: focus position). FIG. 6 shows AF evaluation values (contrast values) C0 to C7. Since the subject is moving toward the camera, the peak position of the AF evaluation value moves from the time T0 to the time T7. Here, to be exact, the peak position means the focus lens position at which the AF evaluation value peaks.

FIG. 6 shows positions P0 to P7 of the focus lens 111. The focus lens position P0 corresponds to the position of the focus lens 111 in FIG. 5(a). The focus lens position P4 corresponds to the position of the focus lens 111 in FIG. 5(b). The focus lens position P6 corresponds to the position of the focus lens 111 in FIG. 5(c). Dashed line graphs shown at the respective times in FIG. 6 plot the AF evaluation values which would be simultaneously calculated at the respective times at the respective focus lens positions, but in reality, the controller 150 can obtain only the AF evaluation value for a single focus lens position at each of the times (corresponding to P0 to P7 in FIG. 6). In this embodiment, the peak position of the AF evaluation value is estimated on the assumption that the subject is moving along the optical axis direction at a uniform velocity.

FIGS. 7(a) to 7(f) are diagrams for describing the operation principle of the moving subject tracking AF in the first embodiment in a situation different from that of FIGS. 5(a) to 5(f) (Subject: moving away from the camera, Initial Position: focus position). Specifically, in FIGS. 7(a) to 7(f), it is assumed that the subject is moving away from the camera and the focus lens 111 is at the closer side of the peak of the AF evaluation value in the in-focus state at the beginning of the AF operation. That is, FIGS. 7(a) to 7(c) illustrate a situation of the subject S moving away from the digital camera 100 in the order of FIG. 7(a), FIG. 7(b), and FIG. 7(c). As a result of extraction of the head of the subject S by the segmentation, the size of the subject S can be detected.

Figure 7:
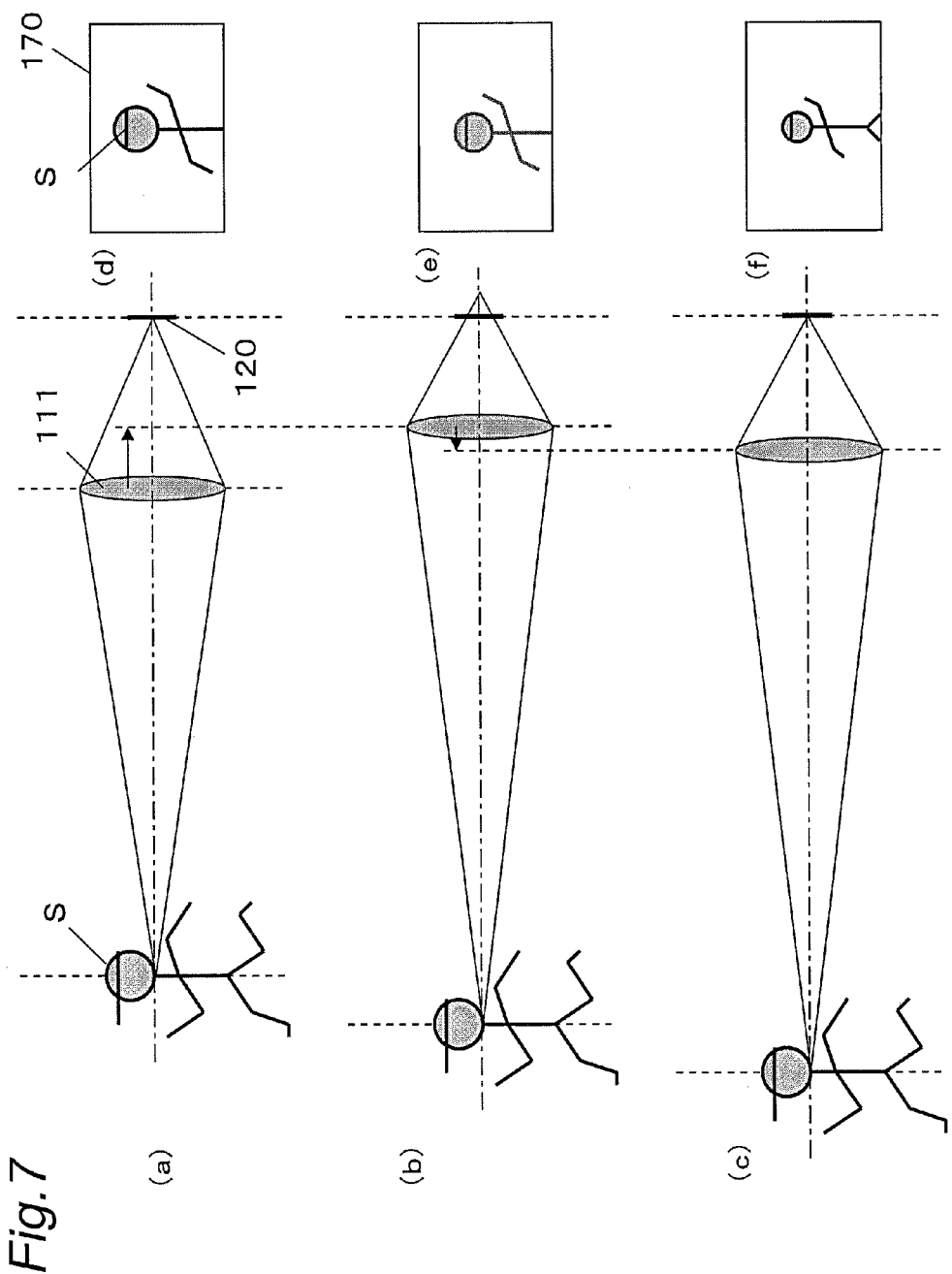
FIGS. 7(a) to 7(f) are principle diagrams of the moving subject tracking AF operation in the first embodiment (Subject: moving away from the camera, Initial Position: focus position).
Figure 8:
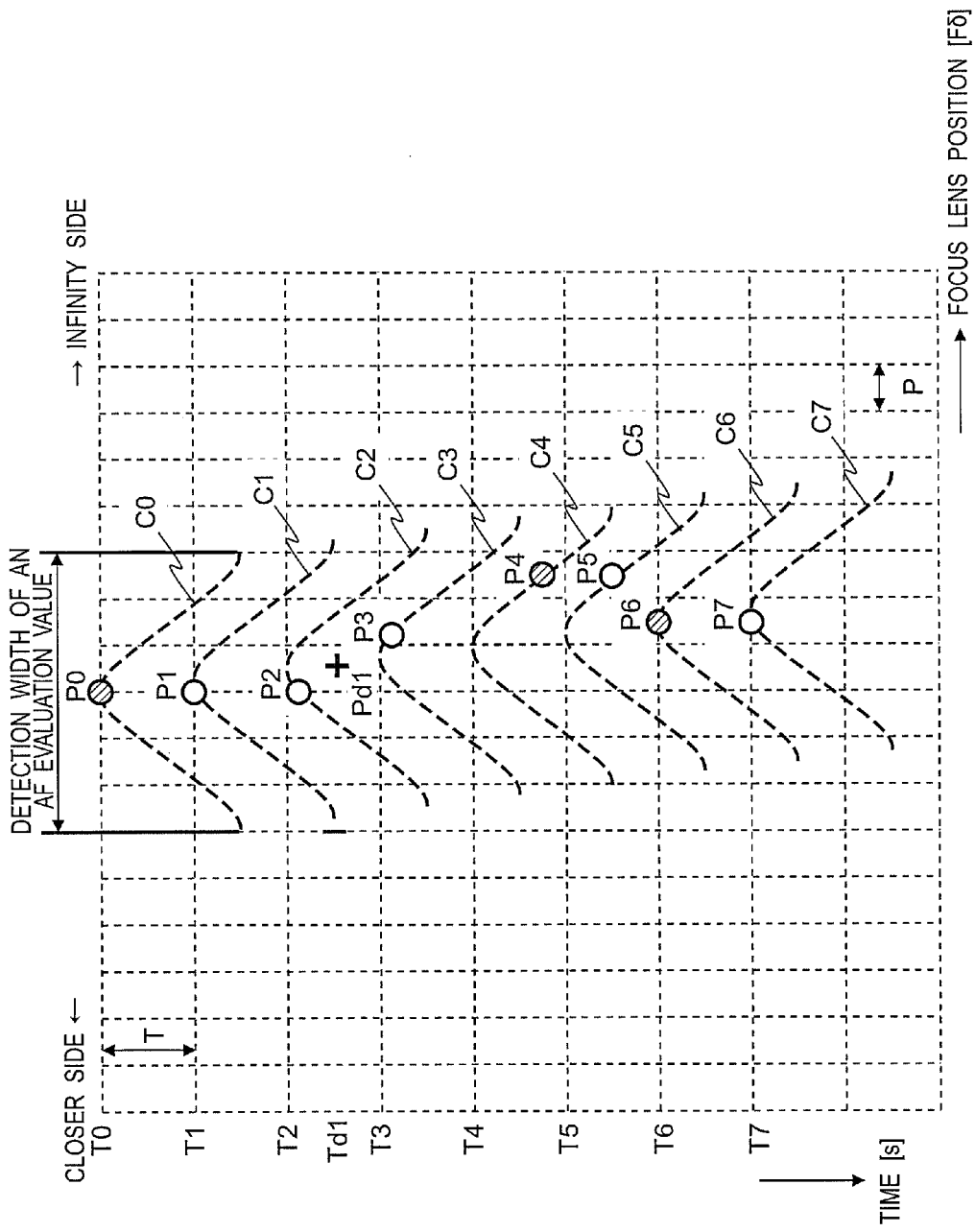
FIG. 8 is an explanatory diagram of the moving subject tracking AF operation in the first embodiment (Subject: moving away from the camera, Initial Position: focus position).

FIG. 8 is an explanatory diagram of the moving subject tracking AF operation in the first embodiment corresponding to FIGS. 7(a) to 7(f) (Subject: moving away from the camera, Initial Position: focus position). FIG. 8 shows AF evaluation values C0 to C7. Since the subject is moving away from the camera, the peak position of the AF evaluation value moves from the time T0 to the time T7.

FIG. 8 shows positions P0 to P7 of the focus lens 111. The focus lens position P0 corresponds to the position of the focus lens 111 in FIG. 7(a). The focus lens position P4 corresponds to the position of the focus lens 111 in FIG. 7(b). The focus lens position P6 corresponds to the position of the focus lens 111 in FIG. 7(c).

Here, each graduation T on the time axis indicates 1/30 [s]. The peak position is indicated by the focus lens position and each graduation P on the focus lens position axis indicates 0.42 [Fδ].

The moving subject tracking AF control operation will be described with reference to the flow charts of FIG. 4A to FIG. 4D. In response to reception of the half-press operation on the release button 181 in the moving subject tracking AF control operation, the controller 150 starts the AF operation (S0). In the first embodiment, it is assumed that the moving subject tracking AF control operation is started when the single AF control operation has brought the subject into focus. The AF operation starts at the time T0.

At the time T0, when the controller 150 has stopped driving the focus lens 111, the controller 150 detects the size of the subject by using the segmentation while detecting the AF evaluation value with respect to the focus lens position P0. Next at the time T1, when the controller 150 has stopped driving the focus lens 111, the controller 150 detects the size of the subject by using the segmentation while detecting the AF evaluation value with respect to the focus lens position P1 (S1). Then, the controller 150 determines whether the size of the subject has changed or not by comparing the size of the subject at the focus lens position P0 with the size of the subject at the focus lens position P1 (S2). In the case where the size of the subject has changed, it can be determined that the subject has moved along the optical axis direction and thus the subject is not in focus. Accordingly, the focus lens 111 needs to be moved. For that reason, the operation proceeds to step S3. On the other hand, in the case where the size of the subject has not changed, it can be determined that the subject has not moved along the optical axis direction. Accordingly, since the focus lens 111 is not required to be moved, the operation returns to step S1.

In the case where it is determined that the size of the subject has changed in step S2, the processes from step S3 onward are performed. It Step S3, the controller 150 determines whether the subject has become bigger. In the case where the subject has become bigger, the operation proceeds to step S40 (FIG. 4B), and in the case where it is determined that the subject has not become bigger (i.e., the subject has become smaller), the operation proceeds to step S41 (FIG. 4C).

Figure 4A:
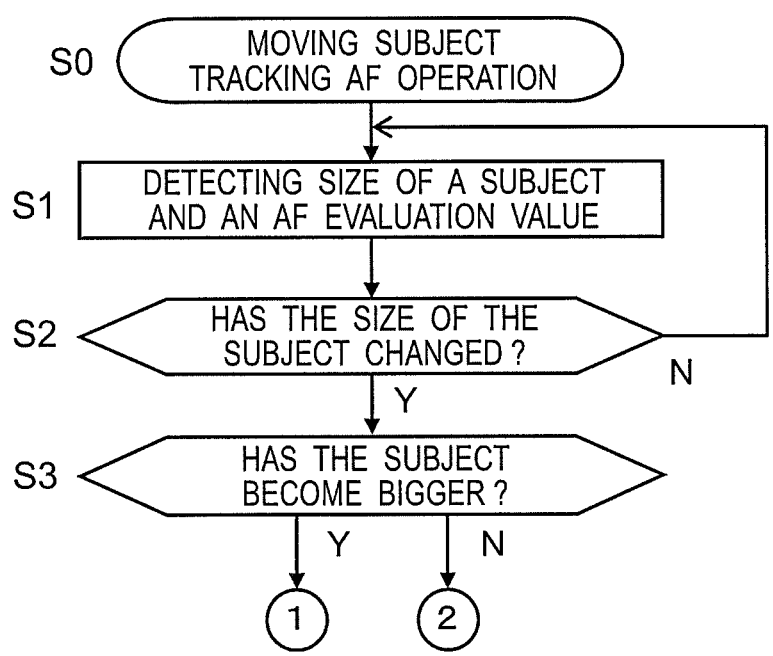
FIG. 4A is a flow chart of a moving subject tracking AF operation in the first embodiment.
Figure 4B:
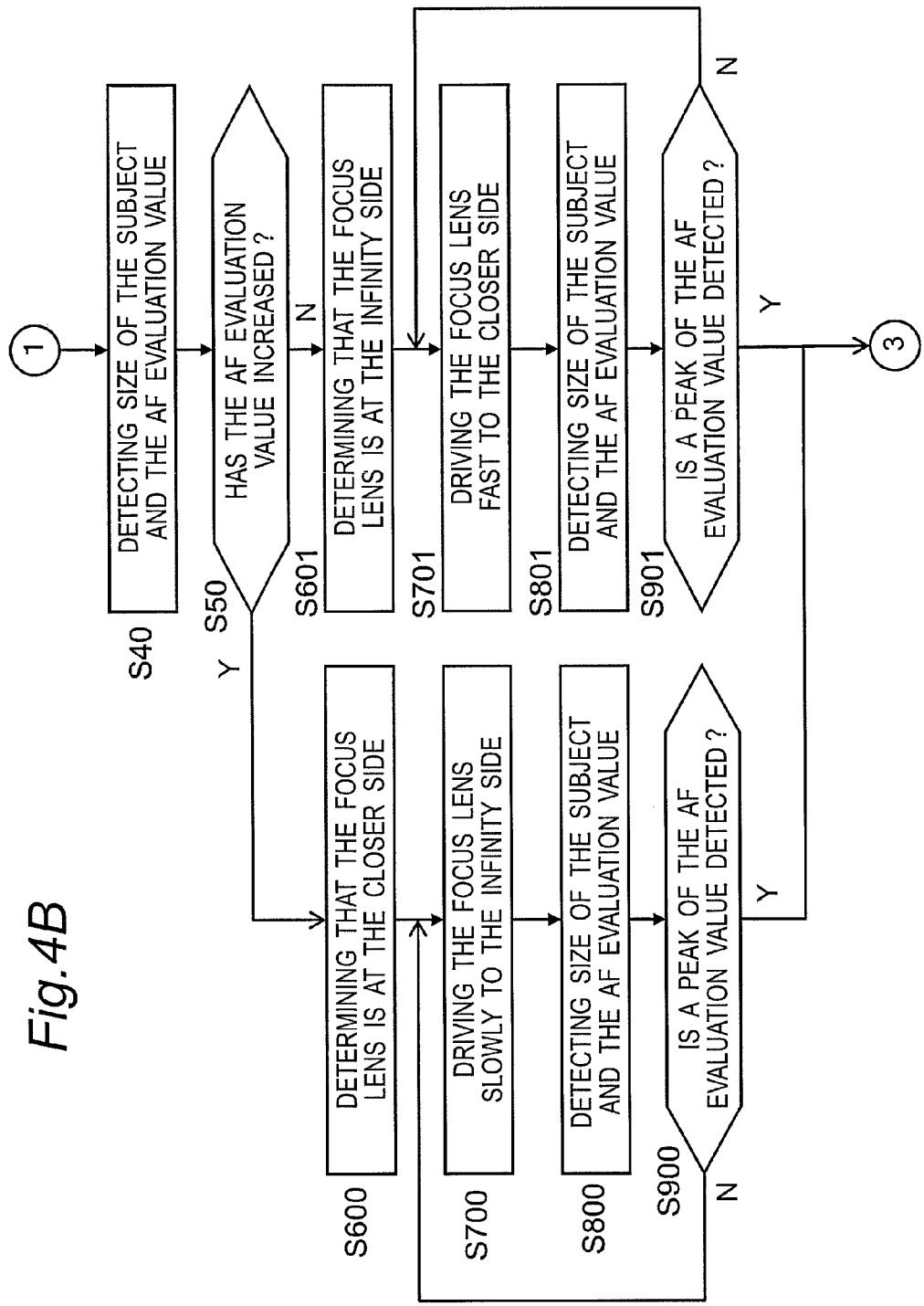
FIG. 4B is a flow chart of the moving subject tracking AF operation in the first embodiment.
Figure 4D:
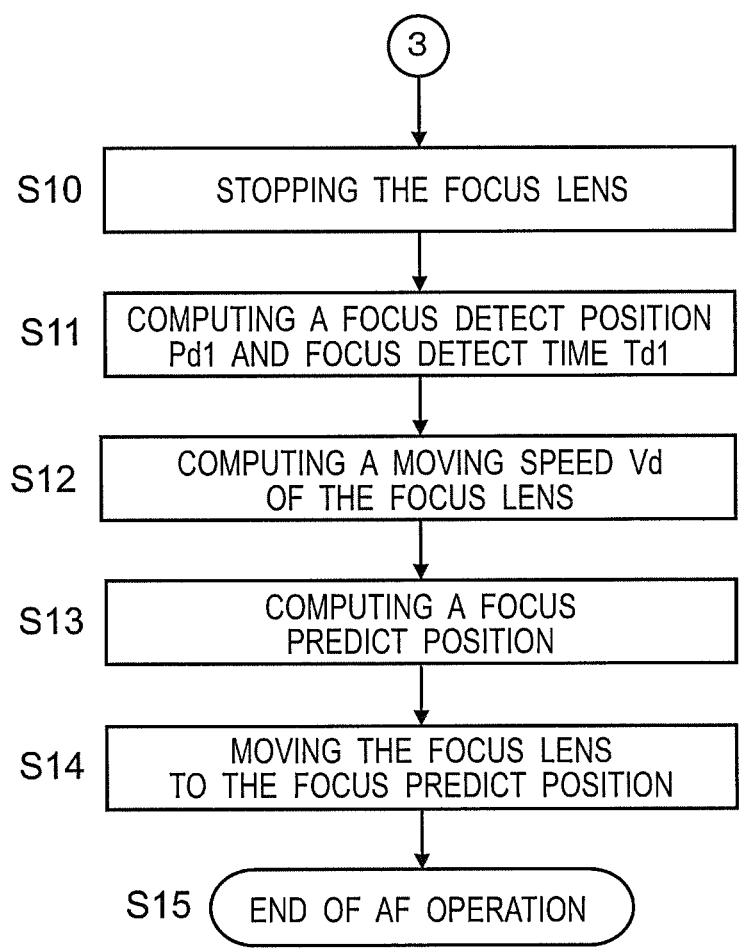
FIG. 4D is a flow chart of the moving subject tracking AF operation in the first embodiment.
Figure 5:
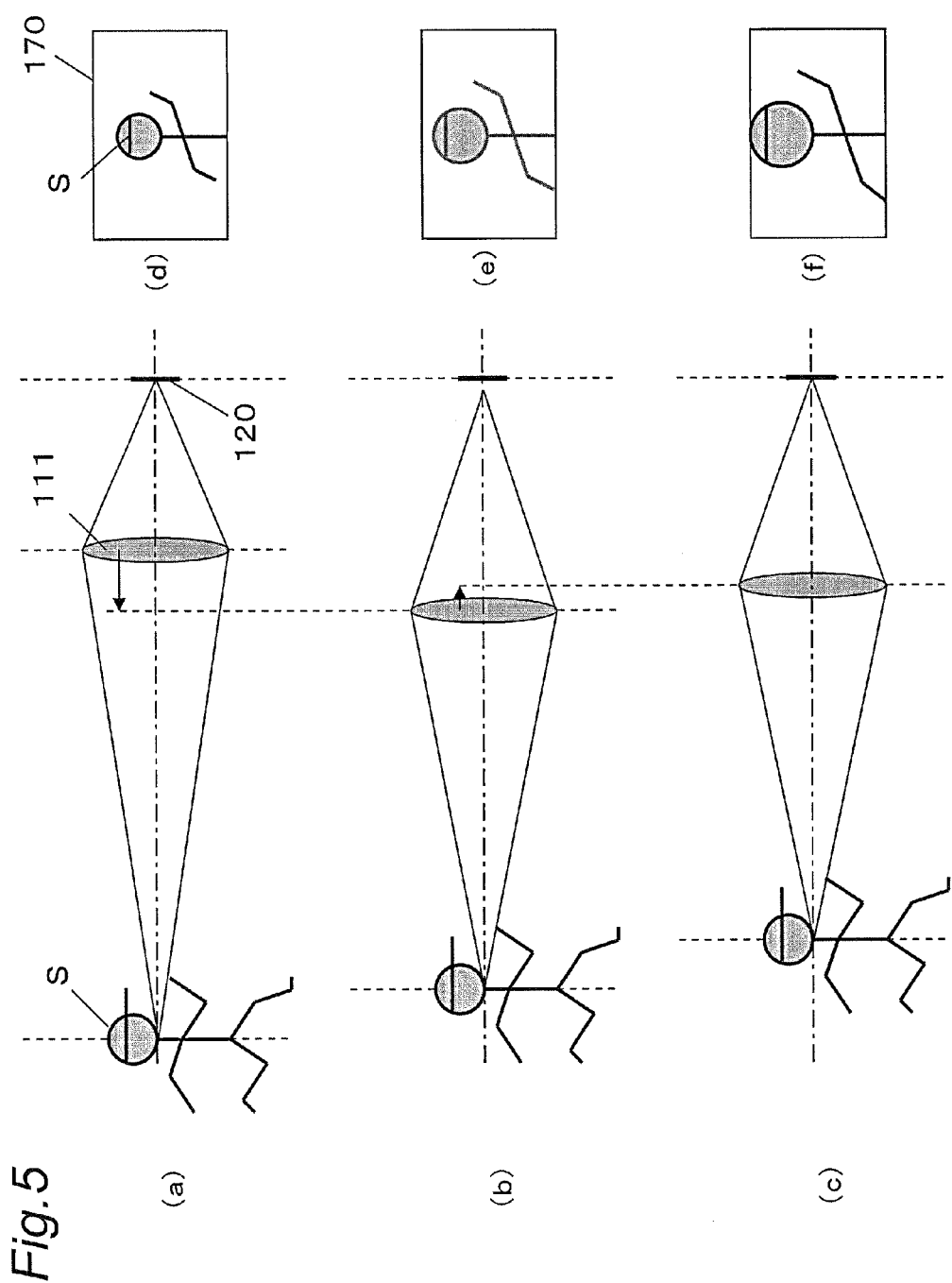
FIGS. 5(a) to 5(f) are principle diagrams of the moving subject tracking AF operation in the first embodiment (Subject: moving toward the camera, Initial Position: focus position).

A. Processes in the Case where the Subject has Become Bigger (FIG. 4B, FIG. 4D)

Processes performed in the case where it is determined that the subject has become bigger (processes from step S40 onward) will be described with reference to FIGS. 5(a) to 5(f) and FIG. 6.

FIGS. 5(a) to 5(f) illustrate a situation of the subject moving toward the camera in the order of FIG. 5(a), FIG. 5(b), and FIG. 5(c) with the lapse of time. Therefore, as illustrated in FIGS. 5(d) to 5(f), the subject S displayed on the liquid crystal display 170 has become relatively bigger with the lapse of time. In that case, since it is determined that the size of the subject has changed in step S2 and it is determined that the size of the subject has become bigger in step S3, the operation proceeds to the process of step S40 (FIG. 4B).

At the time T2, the controller 150 performs the process of step S40. In step S40, when the controller 150 has stopped driving the focus lens 111, the controller 150 detects the size of the subject by using the segmentation while detecting the AF evaluation value at the focus lens position P2 illustrated in FIG. 6. In step S1, when the controller 150 had stopped driving the focus lens 111, the controller 150 detected the AF evaluation values at the focus lens positions P0 and P1 illustrated in FIG. 6. Therefore, the controller 150 determines whether the AF evaluation value at the focus lens position P2 has increased or not by comparing the AF evaluation value at the focus lens position P2 with the AF evaluation values previously detected at the focus lens positions P0 and P1 (S50).

In the example of FIG. 6, the AF evaluation value at the focus lens position P2 has become lower than the AF evaluation values previously detected at the focus lens positions P0 and P1. Therefore, in the flow chart shown in FIG. 4B, the operation proceeds from step S50 to step S601. At that moment, since it is estimated that the peak position of the AF evaluation value C2 (i.e., the focus position) is at the closer side of the focus lens position P2 based on the determination results of steps S3 and S50, the controller 150 determines that the focus lens 111 is at the infinity side of the peak of the AF evaluation value C2 (S601).

Next in step S701, the controller 150 drives the focus lens 111 to the closer side toward the peak of the AF evaluation value. In the example of FIG. 6, since the AF evaluation value decreases in the order of the focus lens positions P0, P1, and P2, it is estimated that the peak position of the AF evaluation value has moved away from the current position of the focus lens 111. Then, the controller 150 can promptly find the peak position of the AF evaluation value by causing the focus lens 111 to be driven to the closer side (to the side of the peak position of the AF evaluation value) at a relatively high speed. Meanwhile, the expression "drive at a relatively high speed" means driving the focus lens 111 at a higher driving speed than a driving speed adopted in the case where the peak position of the AF evaluation value has moved toward the current position of the focus lens 111 (described below).

Next at the time T3, the controller 150 performs the process of step S801. In step S801, the controller 150 detects the size of the subject by using the segmentation while detecting the AF evaluation value at the focus lens position P3 by driving the focus lens 111 to the closer side at a relatively high speed.

In step S901, the controller 150 determines whether the focus lens position has passed the peak position of the AF evaluation value by comparing the AF evaluation values to that point of time. The controller 150 repeats the operation from step S701 to step S901 as far as it determines that the focus lens position has not passed the peak position. At the time T4, the controller 150 detects the AF evaluation value (S801) and compares the AF evaluation values in the order of the focus lens positions P2, P3, and P4 (S901). As a result, since the controller 150 can determine that the focus lens position has passed the peak position of the AF evaluation value, the controller 150 can determine that it has detected the peak position of the AF evaluation value. Then, the controller 150 causes the operation to proceed to step S10 (FIG. 4D) at the time T5 to stop the focus lens 111 (the focus lens position P5).

Subsequently, the controller 150 computes a focus detect position Pd1 and a focus detect time Td1 (S11). With the AF evaluation values at the focus lens positions P0 to P4, the controller 150 can recognize that the focus lens position has passed the peak of the AF evaluation value in the movement from P2 to P3 to P4. In the example of FIG. 6, since the AF evaluation values at the focus lens positions P2 and P3 are equal to each other, the controller 150 can compute and conclude that the peak position is at an intermediate position between the focus lens positions P2 and P3. Further, since the AF evaluation value at the focus lens position P2 was detected at the time T2 and the AF evaluation value at the focus lens position P3 was detected at the time T3, the controller 150 can estimate that the peak of the AF evaluation value was detected also between the time T2 and the time T3. That is, the focus detect position Pd1 is the peak position of the AF evaluation value computed for prediction based on the former AF evaluation values at the moment when the focus lens position has passed the peak position of the AF evaluation value as a result of driving of the focus lens 111. From the AF evaluation values at the respective positions P2, P3, and P4 of the focus lens 111, the controller 150 can compute the focus detect position Pd1 for prediction.

Therefore, the focus detect position Pd1 at which the AF evaluation value peaks can be shown by the expression below.

$$Pd1=(P2+P3)/2$$

Here, since P2=P0 in the example of FIG. 6, and on the condition that the driving speed for "driving the focus lens 111 at a relatively high speed" (i.e., the driving speed adopted in the case where the peak position of the AF evaluation value has moved away from the current position of the focus lens 111) is 1.25 P per 1 T, P3=P0−1.25·P holds. Therefore, the focus detect position Pd1 can be obtained by the expression below.

$$Pd1=P0-0.625\cdot P$$

The time Td1 at which the peak of the AF evaluation value was detected can be shown by the expression below.

$$Td1=(T2+T3)/2$$

Since T2=T0+2·T, T3=T0+3·T, the time Td1 can be shown by the expression below.

$$Td1=T0+2.5\cdot T$$

The symbol "+" in FIG. 6 represents the focus detect position Pd1 and the focus detect time Td1 (the same applies hereinafter).

Subsequently, the controller 150 computes a moving speed Vd of the focus lens 111 (S12).

In this embodiment, it is assumed that the moving subject tracking AF control operation is started when the single AF control operation has brought the subject into focus. In FIG. 6, the position P0 represents the focus position of the focus lens by the single AF control operation and the time T0 represents the time of that focus. As illustrated in FIG. 6, the focus position P0 agrees with the peak position of the AF evaluation value C0. The symbol "+" in FIG. 6 represents the focus detect position Pd1 and the focus detect time Td1 of the focus lens which were computed in step S11. Therefore, the controller 150 can cause the peak of the AF evaluation value to agree with the focus lens position with respect to a moving subject by spending a time period (Td1-T0) in moving the focus lens from the position P0 to the position Pd1. Consequently, the moving speed Vd of the focus lens 111 for keeping the moving subject in focus (i.e., for causing the peak of the AF evaluation value to agree with the focus lens position) can be shown by the expression below.

$$Vd=(Pd1-P0)/(Td1-T0)=-0.25\cdot P/T$$

Subsequently, the controller 150 computes a focus predict position P6 (S13). The controller 150 can compute the amount of movement of the focus lens 111 from the moving speed Vd of the focus lens 111 for keeping the moving subject in focus and an elapsed time period T. The position P6 of the focus lens 111 for keeping the in-focus state at the time T6 can be computed from the focus lens position P0 at the time T0 using the expressions below.

$$P6 = P0 + Vd \cdot (T6 - T0)$$
$$= P0 + 6 \cdot Vd \cdot T$$
$$= P0 - 1.5 \cdot P$$

The focus lens position P5 at the time T5 can be shown by the expression below.

$$P5 = P0 - 2.5 \cdot P$$

Therefore, the amount of movement ΔP for moving the focus lens 111 from the focus lens position P5 at the time T5 to the focus predict position P6 at the time T6 when the time period T has passed from the time T5 can be shown by the expression below.

$$\Delta P = P6 - P5 = 1.0 \cdot P$$

Then at the time T6, the controller 150 performs the process of step S14. In step S14, the controller 150 causes the focus lens 111 to move to the focus predict position P6 (S14) and finishes the AF operation (S15). That is, as a result of the moving of the focus lens 111 from the focus lens position P5 by ΔP, the controller 150 can keep the moving subject in focus.

In the above example, the operation (9601 to S901) in the case where it is determined that the subject has become bigger in step S3 and then it is determined that the AF evaluation value has decreased in step S50 has been described. In the case where it is determined that the AF evaluation value has increased in step S50, the processes from step S600 to S900 are performed. In that case, the controller 150 determines that the focus lens 111 is at the closer side of the peak position of the AF evaluation value (S600) and drives the focus lens 111 to the infinity side at a relatively low speed slower than the speed adopted in step S701 (S700). The processes in that case are the same as the above described processes performed in the case where it is determined that the AF evaluation value has decreased except for the driving direction of the focus lens 111.

B. Processes in the Case where the Subject has Become Smaller (FIG. 4C, FIG. 4D)

Now, processes performed in the case where it is determined that the subject has become smaller in step S3 (processes from step S41 onward) will be described with reference to FIGS. 7(*a*) to 7(*f*) and FIG. 8. FIGS. 7(*a*) to 7(*f*) illustrate a situation of the subject moving away from the camera in the order of FIG. 7(*a*), FIG. 7(*b*), and FIG. 7(*c*) with the lapse of time. Therefore, as illustrated in FIGS. 7(*d*) to 7(*f*), the subject S displayed on the liquid crystal display 170 has become relatively smaller with the lapse of time. In that case, since it is determined that the size of the subject has changed in step S2 and it is determined that the size of the subject has become smaller in step S3, the operation proceeds to the process of step S41 (FIG. 4C).

At the time T2, the controller 150 performs the process of step S41. In step S41, when the controller 150 has stopped driving the focus lens 111, the controller 150 detects the size of the subject by using the segmentation while detecting the AF evaluation value at the focus lens position P2 illustrated in FIG. 8. In step S1, when the controller 150 had stopped driving the focus lens 111, the controller 150 detected the AF evaluation values at the focus lens positions P0 and P1 illustrated in FIG. 8. Therefore, the controller 150 determines whether the AF evaluation value at the focus lens position P2 has increased or not by comparing the AF evaluation value at the focus lens position P2 with the AF evaluation values previously detected at the focus lens positions P0 and P1 (S51).

In the example of FIG. 8, the AF evaluation value at the focus lens position P2 has become lower than the AF evaluation values previously detected at the focus lens positions P0 and P1. Therefore, in the flow chart shown in FIG. 4C, the operation proceeds from step S51 to step S610. At that moment, it is estimated that the peak position of the AF evaluation value C2 (i.e., the focus position) is at the infinity side of the focus lens position P2. Therefore, the controller 150 determines that the focus lens 111 is at the closer side of the peak of the AF evaluation value C2 (S610). That is, the controller 150 can also determine that the position of the focus lens 111 is closer to the subject than the peak position of the AF evaluation value is. In other words, the controller 150 can also determine that the focus position for the position of the focus lens 111 is before the imaging plane.

Next in step S710, the controller 150 drives the focus lens 111 to the infinity side toward the peak of the AF evaluation value. In the example of FIG. 8, since the AF evaluation value decreases in the order of the focus lens positions P0, P1, and P2, it is estimated that the peak position of the AF evaluation value has moved away from the current position of the focus lens 111.

Then, the controller 150 causes the focus lens 111 to be driven to the infinity side (to the imaging plane side) at a relatively high speed to move the focus position to the imaging plane side. As a result, the controller 150 can promptly find the peak position of the AF evaluation value.

Next at the time T3, the controller 150 performs the process of step S810. In step S810, the controller 150 detects the size of the subject by using the segmentation while detecting the AF evaluation value from the focus lens position P3 onward by driving the focus lens 111 to the infinity side at a relatively high speed.

In step S910, the controller 150 determines whether the focus lens position has passed the peak position of the AF evaluation value by comparing the AF evaluation values to that point of time. The controller 150 repeats the operation from step S710 to step S910 as far as it determines that the focus lens position has not passed the peak position. At the time T4, the controller 150 detects the AF evaluation value (S810) and compares the AF evaluation values in the order of the focus lens positions P2, P3, and P4 (S910). As a result, since the controller 150 can determine that the focus lens position has passed the peak position of the AF evaluation value, the controller 150 can determine that it has detected the peak position of the AF evaluation value. Then, the controller 150 causes the operation to proceed to step S10 (FIG. 4D) at the time T5 to stop the focus lens ill (the focus lens position P5).

Subsequently, the controller 150 computes the focus detect position Pd1 and the focus detect time Td1 (S11). With the AF evaluation values at the focus lens positions P0 to P4, the controller 150 can recognize that the focus lens position has passed the peak of the AF evaluation value in the movement from P2 to P3 to P4. In the example of FIG.

8, since the AF evaluation values at the focus lens positions P2 and P3 are equal to each other, the controller 150 can compute and conclude that the peak position is at an intermediate position between the focus lens positions P2 and P3. Further, since the AF evaluation value at the focus lens position P2 was detected at the time T2 and the AF evaluation value at the focus lens position P3 was detected at the time T3, the controller 150 can estimate that the peak of the AF evaluation value was detected also between the time T2 and the time T3.

Therefore, the focus detect position Pd1 at which the AF evaluation value peaks can be shown by the expression below.

$$Pd1=(P2+P3)/2$$

Here, since P2=P0, P3=P0−1.25·P, Pd1 is shown by the expression below.

$$Pd1=P0+0.625·P$$

The time Td1 at which the peak of the AF evaluation value was detected can be shown by the expression below.

$$Td1=(T2+T3)/2$$

Here, since T2=T0+2·T, T3=T0+3·T, the expression below can be obtained.

$$Td1=T0+2.5·T$$

Subsequently, the controller 150 computes the moving speed Vd of the focus lens 111 (S12). In the first embodiment, it is assumed that the moving subject tracking AF control operation is started when the single AF control operation has brought the subject into focus. In FIG. 8, the position P0 represents the focus position of the focus lens by the single AF control operation and the time T0 represents the time of that focus. As illustrated in FIG. 8, the focus position P0 agrees with the peak position of the AF evaluation value C0. The symbol "+" in FIG. 8 represents the focus detect position Pd1 and the focus detect time Td1 of the focus lens which have been computed in step S11. Therefore, the controller 150 can cause the peak of the AF evaluation value to agree with the focus lens position with respect to a moving subject by spending a time period Td1-T0 in moving the focus lens from the position P0 to the position Pd1. Consequently, the moving speed Vd of the focus lens 111 for keeping the moving subject in focus (i.e., for causing the peak of the AF evaluation value to agree with the focus lens position) can be shown by the expression below.

$$Vd=(Pd1-P0)/(Td1-T0)=-0.25·P/T$$

Subsequently, the controller 150 computes the focus predict position P6 (S13). The controller 150 can compute the amount of movement of the focus lens 111 from the moving speed Vd of the focus lens 111 for keeping the moving subject in focus and the elapsed time period T. The position P6 of the focus lens ill for keeping the in-focus state at the time T6 can be computed from the focus lens position P0 at the time T0 using the expressions below.

$$P6 = P0 + Vd·(T6-T0)$$
$$= P0 + 6·Vd·T$$
$$= P0 + 1.5·P$$

The focus lens position P5 at the time T5 can be shown by the expression below.

$$P5=P0+2.5·P$$

With the above described expression taken into account, the amount of movement ΔP for moving the focus lens 111 from the focus lens position P5 at the time T5 to the focus predict position P6 at the time T6 when the time period T has passed from the time T5 can be shown by the expression below.

$$\Delta P = P6 - P5$$
$$= -1.0·P$$

Then at the time T6, the controller 150 causes the focus lens 111 to move to the focus predict position P6 (S14) and finishes the AF operation (S15). That is, as a result of moving of the focus lens ill from the focus lens position P5 by ΔP, the controller 150 can keep the moving subject in focus.

In the above example, the operation (S610 to S910) in the case where it is determined that the subject has become smaller in step S3 and then it is determined that the AF evaluation value has decreased in step S51 has been described. In the case where it is determined that the AF evaluation value has increased in step S51, the processes from step S611 to S911 are performed. In that case, the controller 150 determines that the focus lens ill is at the infinite distance side of the peak position of the AF evaluation value (S611) and drives the focus lens 111 to the closer side at a relatively low speed (S711). The processes in that case are the same as the above described processes performed in the case where it is determined that the AF evaluation value has decreased except for the driving direction of the focus lens 111.

C. Movement of Lens for Improving the Focusing Accuracy

Now, a method of moving the focus lens 111 for further improving the focusing accuracy with respect to a moving subject will be described with reference to FIGS. 9(a) to 9(d) and FIGS. 10(a) and 10(b). Here, a method of computing the amount of movement of the focus lens 111 for keeping a subject moving toward the camera in focus will be described. FIGS. 9(a) to 9(d) are diagrams describing a computational algorithm for a focus position of the moving subject tracking AF in the first embodiment. FIGS. 10(a) and 10(b) are diagrams for describing a principle of segment range detection of the moving subject tracking AF in the first embodiment.

FIG. 9(a) illustrates that an image of the subject S is formed on the CCD image sensor 120 in focus through the focus lens 111. FIG. 9(c) illustrates the subject image in focus at the above described moment being displayed on the liquid crystal display 170. FIG. 9(b) illustrates that the subject S has moved toward the camera closer than the subject S illustrated in FIG. 9(a) is so that an out-of-focus image of the subject is formed on the CCD image sensor 120 through the focus lens 111. Since the focus lens 111 has not moved from the position illustrated in FIG. 9(a), the position of the subject to be in focus is behind the real subject S, i.e., at a rear focus position. On the other hand, at the CCD image sensor 120 side, the focus position is behind the CCD image sensor 120. In the case of FIG. 9(b), the subject image bigger than that in the case of FIG. 9(c) is displayed on the liquid crystal display 170 out of focus as illustrated in FIG. 9(d).

Under the in-focus state illustrated in FIG. 9(a), the controller 150 can detect the distance b0 from the focus lens 111 to the CCD image sensor 120. On the condition that the subject S is in focus at that moment, the controller 150 can also calculate the distance a0 from the subject S to the focus lens 111. Therefore, the distance a0 from the subject S to the focus lens 111 and the distance b0 from the focus lens 111 to the CCD image sensor 120 can be recognized by the controller 150.

On the other hand, under the out-of-focus state illustrated in FIG. 9(*b*), since the focus lens ill has not been moved, the controller 150 can recognize the distance b0 from the focus lens 111 to the CCD image sensor 120. However, in order to recognize a distance a1 from the subject S to the focus lens 111, the controller 150 needs to know the rate of change of the size of the subject S by using the segmentation.

Figure 10:
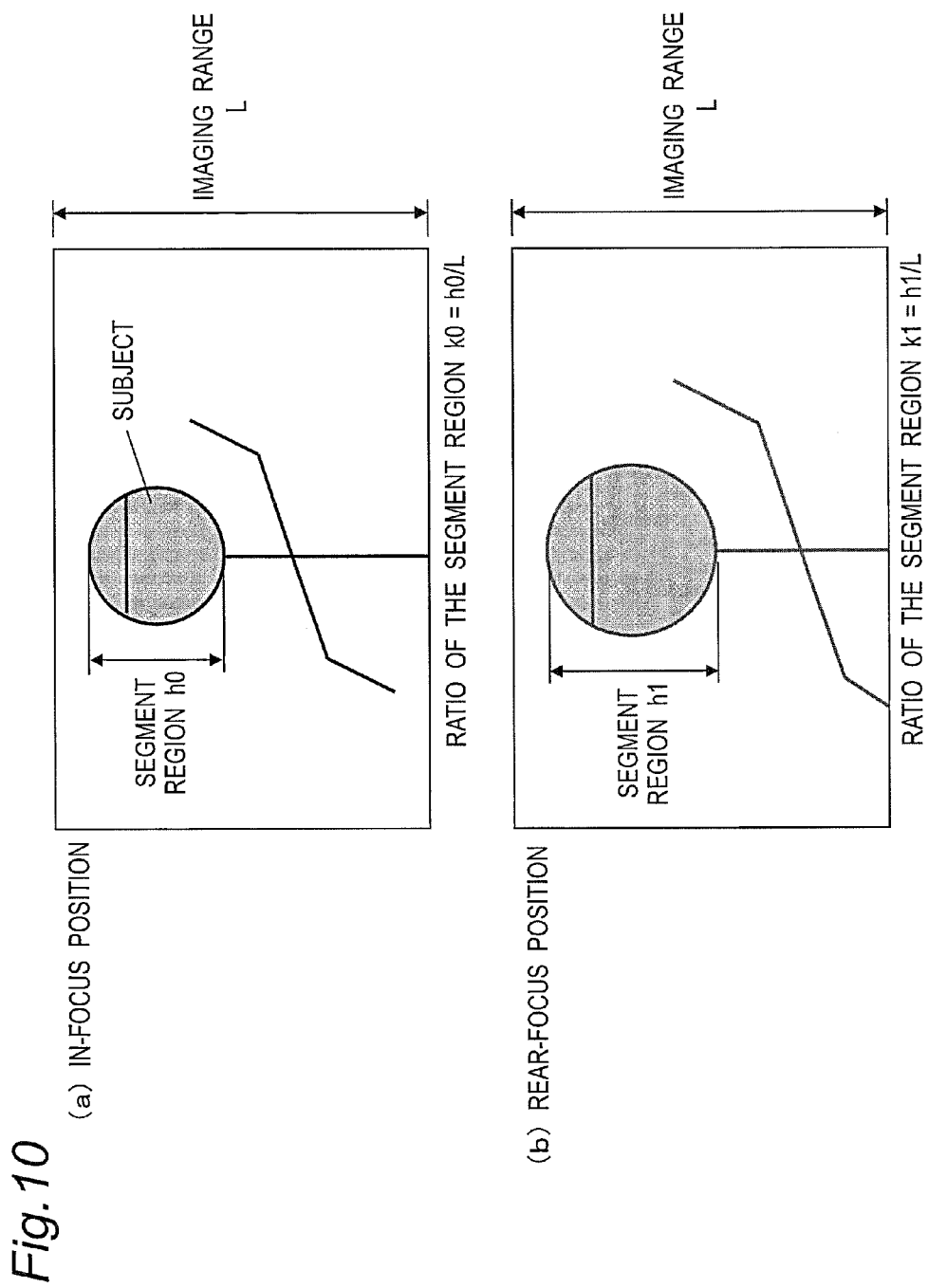
FIGS. 10(a) and 10(b) are principle diagrams of segment range detection of the moving subject tracking AF in the first embodiment.

FIG. 10(*a*) illustrates that the subject S is in focus as in FIG. 9(*a*). In FIG. 10(*a*), the controller 150 detects the size of the subject head that the controller 150 has recognized by using the segmentation in a vertical range (imaging range) L of the liquid crystal display 170 as a segment range h0 in the vertical direction. The ratio of the segment range h0 to the imaging range L can be expressed as k0=h0/L.

FIG. 10(*b*) illustrates that the subject is out of focus as in FIG. 9(*b*). In FIG. 10 (*b*), the controller 150 detects the size of the subject head that the controller 150 has recognized by using the segmentation in the vertical range (imaging range) L of the liquid crystal display 170 as a segment range h1 in the vertical direction. The ratio of the segment range h1 to the imaging range L can be expressed as k1=h1/L. Since the controller 150 has not moved the focus lens 111, the controller 150 can detect a moved distance of the subject based on a magnification change of the subject image by using the ratio of the segment range of the subject. As shown by the expression below, the controller 150 can calculate the distance a1 from the subject to the focus lens 111.

$$a1 = a0 \cdot (k0/k1)$$

Further, the controller 150 can calculate the amount of movement Δa of the subject from the position illustrated in FIG. 9(*a*) to the position illustrated in FIG. 9(*b*) by the expression below.

$$\Delta a = a1 - a0 = a0 \cdot (k0/k1 - 1)$$

Therefore, the controller 150 can calculate the amount of drawing out the focus lens 111 Δb for keeping the subject in focus in FIG. 9(*b*) by the expression below using a general equation.

$$\Delta b = -(b0^2/a0^2) \cdot \Delta a$$

That is, as described in (1-2-2) above, the controller 150 can keep a moving subject in focus by detecting the magnitude of the AF evaluation value and the size of the subject. Specifically, the controller 150 can compute the amount of movement of the focus lens 111 for keeping the in-focus state by computing the rate of change of the subject image size (hereinafter, referred to as "magnification change") in detail by using the segmentation. Here, the controller 150 may move the focus lens 111 to the position to focus on the subject by the amount of movement of the focus lens 111 obtained by the detailed computation of the magnification change of the subject image in place of the amount of movement of the focus lens 111 obtained by using the AF evaluation value. Alternatively, the controller 150 may correct the amount of movement of the focus lens 111 obtained by using the AF evaluation value with the amount of movement of the focus lens 111 obtained by the detailed computation of the magnification change of the subject image.

As described above, in the first embodiment, the controller 150 can compute the amount of movement of the focus lens for keeping the in-focus state of the subject moving toward the camera. Then, by performing the drive control on the focus lens 111 with the amount of movement obtained by the computation, the controller 150 can perform the moving subject tracking AF control operation which is for keeping the in-focus state of the subject moving toward the camera.

In the description above, the magnification change of the subject image is expressed as the ratio k0/k1 by using the ratio k0 of the segment range in the in-focus state of the subject and the ratio k1 of the segment range in the out-of-focus state of the subject. In the case where the ratio of the magnification change of the subject image k0/k1 is calculated by using the specific numerical values in the aforementioned conditions (1) to (4), the expression below is given.

$$k0/k1 = (a0 - \Delta a)/a0$$
$$= (11688 - 233.3)/11688$$
$$= 0.980039$$

On the other hand, the magnification change of the subject image is expressed as below by using the ratios of the segment ranges in out-of-focus states of the subject. Assuming that the ratio of the magnification change of the subject image k6/k7 is calculated by using the ratios of the segment ranges in out-of-focus states when the time period of 6×T and 7×T has passed from the in-focus state at the time T0 under the condition that the subject is moving toward the camera at a rate of 7 m/s while the focus lens 111 is fixed as an example, the result is given as below.

$$k6/k7 = (a0 - 7 \times \Delta a)/(a0 - 6 \times \Delta a)$$
$$= (11688 - 7 \times 233.3)/(11688 - 6 \times 233.3)$$
$$= 0.977324$$

The ratio k6/k5 has a margin of error of about −0.3% as compared with the ratio k0/k1. Therefore, it is not necessarily required to calculate the magnification change of the subject image by using the ratio of the segment range in the in-focus state. As a result of the calculation of the magnification change of the subject image by using the ratios of the segment ranges in out-of-focus states, a relatively accurate speed of the subject moving toward or away from the camera can be obtained. The same idea can also be applied to the second embodiment.

2. Second Embodiment

2-1. Configuration

Since the configuration of the digital camera 100 of the second embodiment is the same as that of the first embodiment, the description of it is omitted.

2-2. Operation (2-2-1. Moving Subject Tracking AF Control Operation in the Second Embodiment)

The moving subject tracking AF control operation in the second embodiment will be described with reference to FIGS. 11A to 11D and 12 to 19. FIGS. 11A to 11D are flow charts showing the moving subject tracking AF operation in the second embodiment. The flow charts of FIGS. 11A to 11D are the same as those of FIGS. 4A to 4D except for step S12A.

FIGS. 12(a) to 12(f) are diagrams for describing the operation principle of the moving subject tracking AF in the second embodiment (Subject: moving toward the camera, Initial Position: out-of-focus (infinity side)). In FIGS. 12(a) to 12(f), it is assumed that the subject is moving toward the camera and the focus lens 111 is at the infinite distance side of the peak of the AF evaluation value in the out-of-focus state at the beginning of the AF operation. That is, FIGS. 12(a) to 12(c) illustrate a situation of the subject S moving toward the camera 100 in the order. The subject S is moving toward the camera 100 in the order of FIG. 12(a), FIG. 12(b), and FIG. 12(c). As a result of extraction of the head of the subject S by the segmentation, the size of the subject S can be detected.

Figure 13:
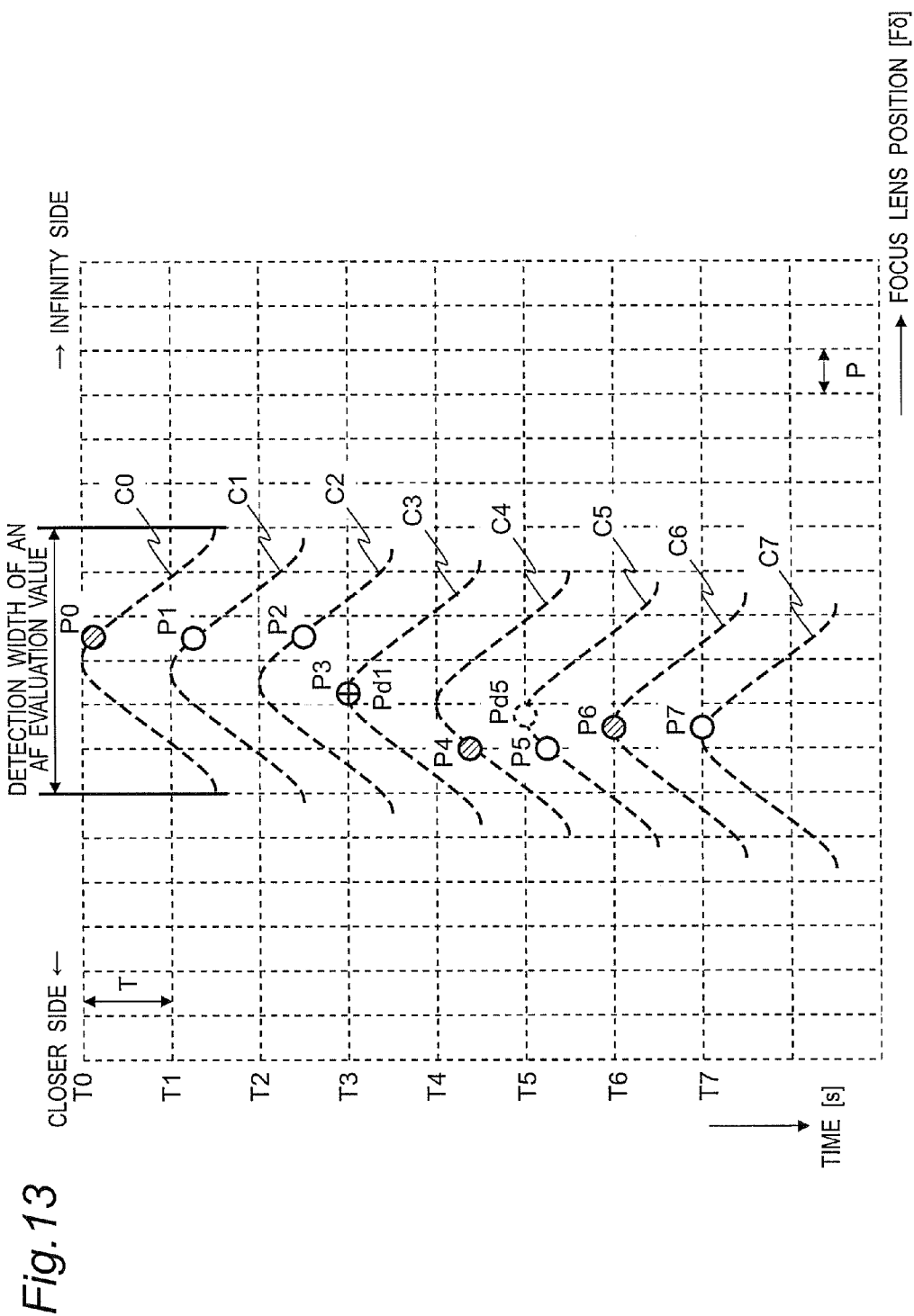
FIG. 13 is an explanatory diagram of the moving subject tracking AF operation in the second embodiment (Subject: moving toward the camera, Initial Position: out-of-focus (infinity side)).
Figure 14:
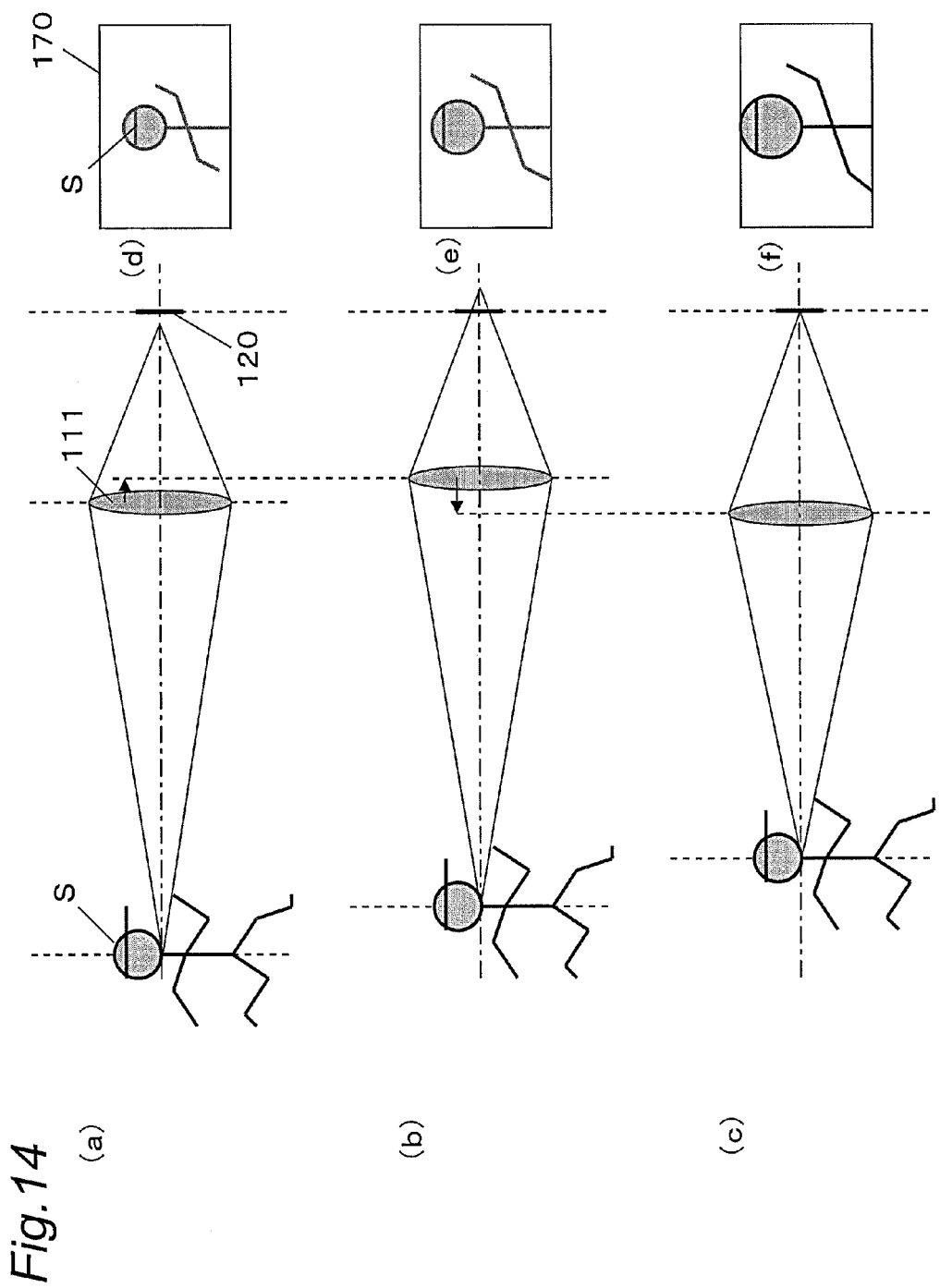
FIGS. 14(a) to 14(f) are principle diagrams of the moving subject tracking AF operation in the second embodiment (Subject: moving toward the camera, Initial Position: out-of-focus (closer side)).

FIG. 13 is a diagram for describing the operation of the moving subject tracking AF in the second embodiment corresponding to FIGS. 12(a) to 12(f) (Subject: moving toward the camera, Initial Position: out-of-focus (infinity side)). FIG. 13 shows AF evaluation values C0 to C7, and since the subject is moving toward the camera, the peak position of the AF evaluation value moves from the time T0 to the time T7. FIG. 13 shows positions P0 to P7 of the focus lens 111. The focus lens position P0 corresponds to the position of the focus lens 111 in FIG. 12(a). The focus lens position P4 corresponds to the position of the focus lens 111 in FIG. 12(b). The focus lens position P6 corresponds to the position of the focus lens 111 in FIG. 12(c).

FIGS. 14(a) to 14(f) are diagrams for describing the operation principle of the moving subject tracking AF in the second embodiment in a situation different from that of FIGS. 12(a) to 12(f) (Subject: moving toward the camera, Initial Position: out-of-focus (closer side)). Specifically, in FIGS. 14(a) to 14(f), it is assumed that the subject is moving toward the camera and the focus lens 111 is at the closer side of the peak of the AF evaluation value in the out-of-focus state at the beginning of the AF operation. FIGS. 14(a) to 14(c) illustrate a situation of the subject S moving toward the camera 100. The subject S is moving toward the camera 100 in the order of FIG. 14(a), FIG. 14(b), and FIG. 14(c). As a result of extraction of the head of the subject S by the segmentation, the size of the subject S can be detected.

Figure 15:
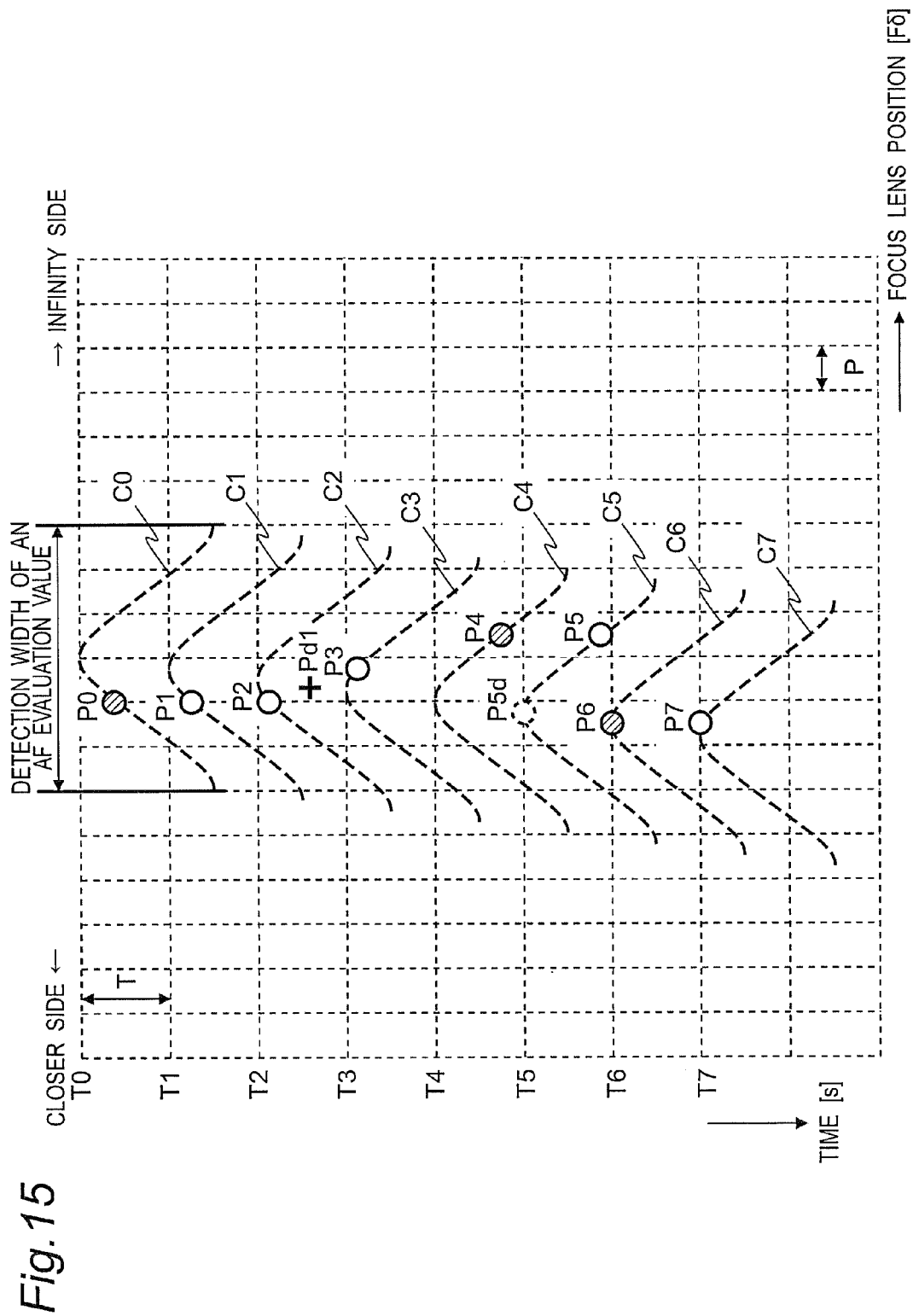
FIG. 15 is an explanatory diagram of the moving subject tracking AF operation in the second embodiment (Subject: moving toward the camera, Initial Position: out-of-focus (closer side)).
Figure 16:
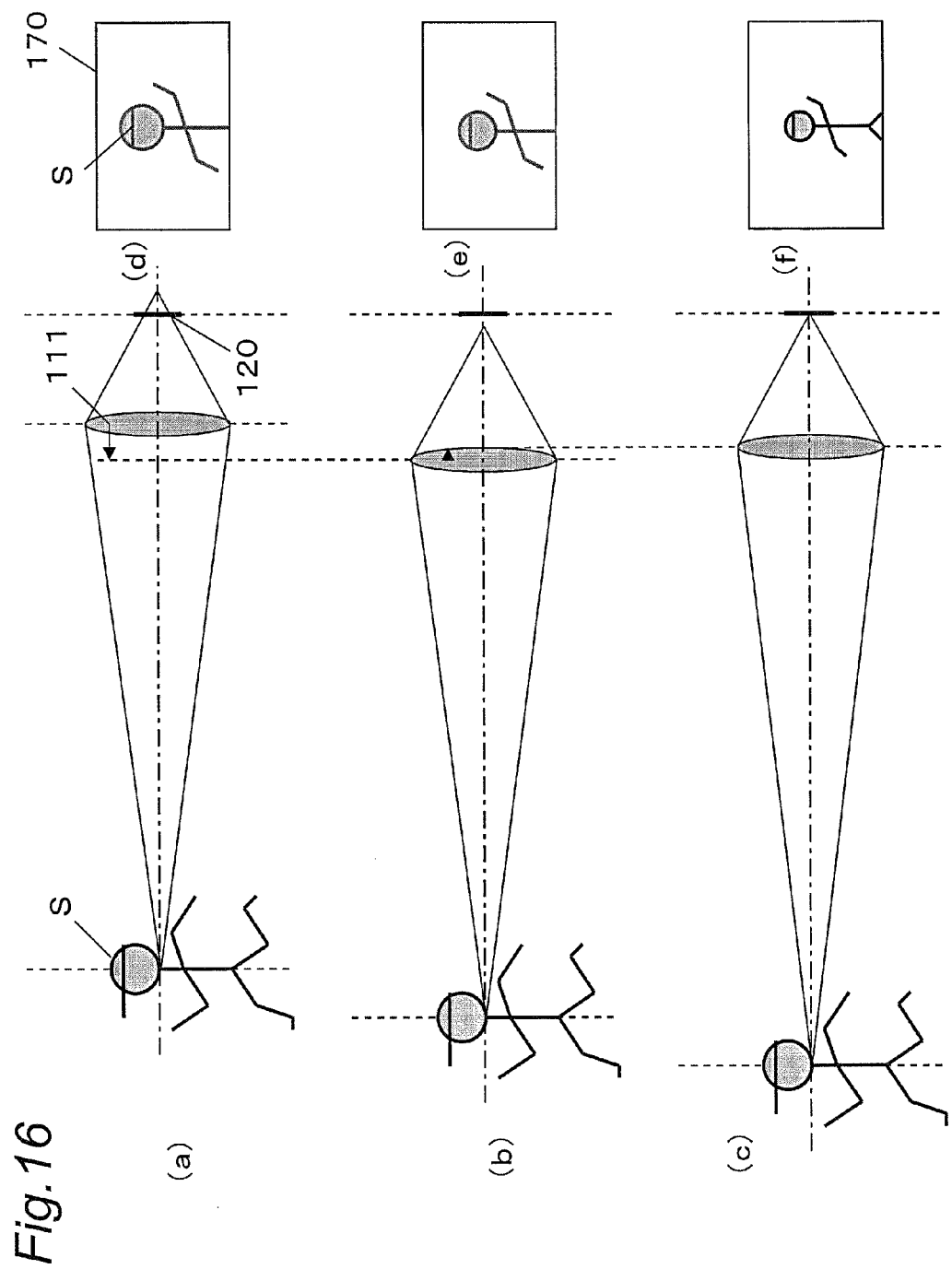
FIGS. 16(a) to 16(f) are principle diagrams of the moving subject tracking AF operation in the second embodiment (Subject: moving away from the camera, Initial Position: out-of-focus (infinity side)).

FIG. 15 is a diagram for describing the operation of the moving subject tracking AF in the second embodiment corresponding to FIGS. 14(a) to 14(f) (Subject: moving toward the camera, Initial Position: out-of-focus (closer side)). FIG. 15 shows AF evaluation values C0 to C7, and since the subject is moving toward the camera, the peak position of the AF evaluation value moves from the time T0 to the time T7. FIG. 15 shows positions P0 to P7 of the focus lens 111. The focus lens position P0 corresponds to the position of the focus lens 111 in FIG. 14(a). The focus lens position P4 corresponds to the position of the focus lens 111 in FIG. 14(b). The focus lens position P6 corresponds to the position of the focus lens 111 in FIG. 14(c).

FIGS. 16(a) to 16(f) are diagrams for describing the operation principle of the moving subject tracking AF in the second embodiment (Subject: moving away from the camera, Initial Position: out-of-focus (infinity side)). Specifically, in FIGS. 16(a) to 16(f), it is assumed that the subject is moving away from the camera and the focus lens 111 is at the infinite distance side of the peak of the AF evaluation value in the out-of-focus state at the beginning of the AF operation. The subject S in FIGS. 16(a) to 16(f) is moving away from the camera in the order of FIG. 16(a), FIG. 16(b), and FIG. 16(c).

Figure 17:
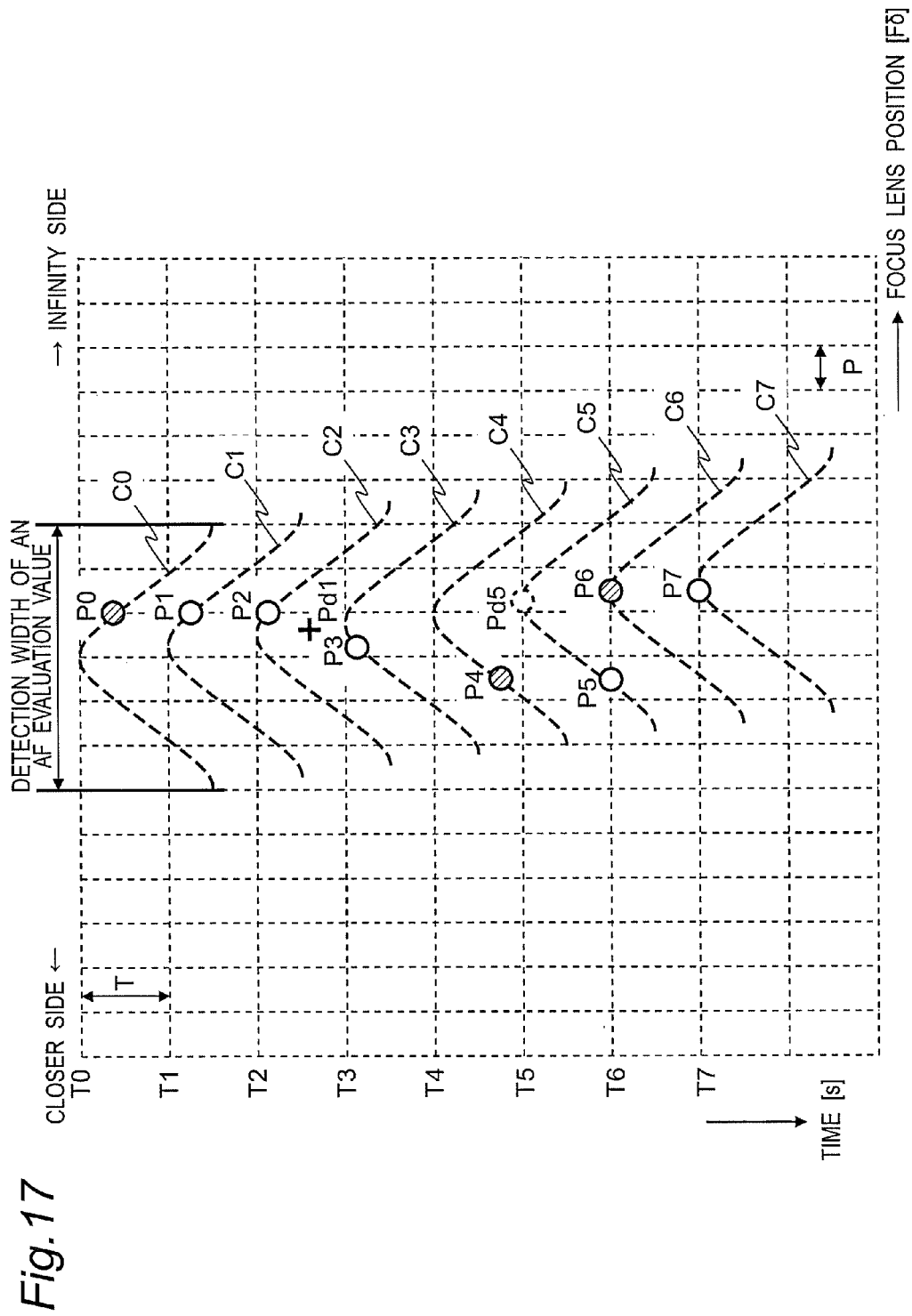
FIG. 17 is an explanatory diagram of the moving subject tracking AF operation in the second embodiment (Subject: moving away from the camera, Initial Position: out-of-focus (infinity side)).
Figure 18:
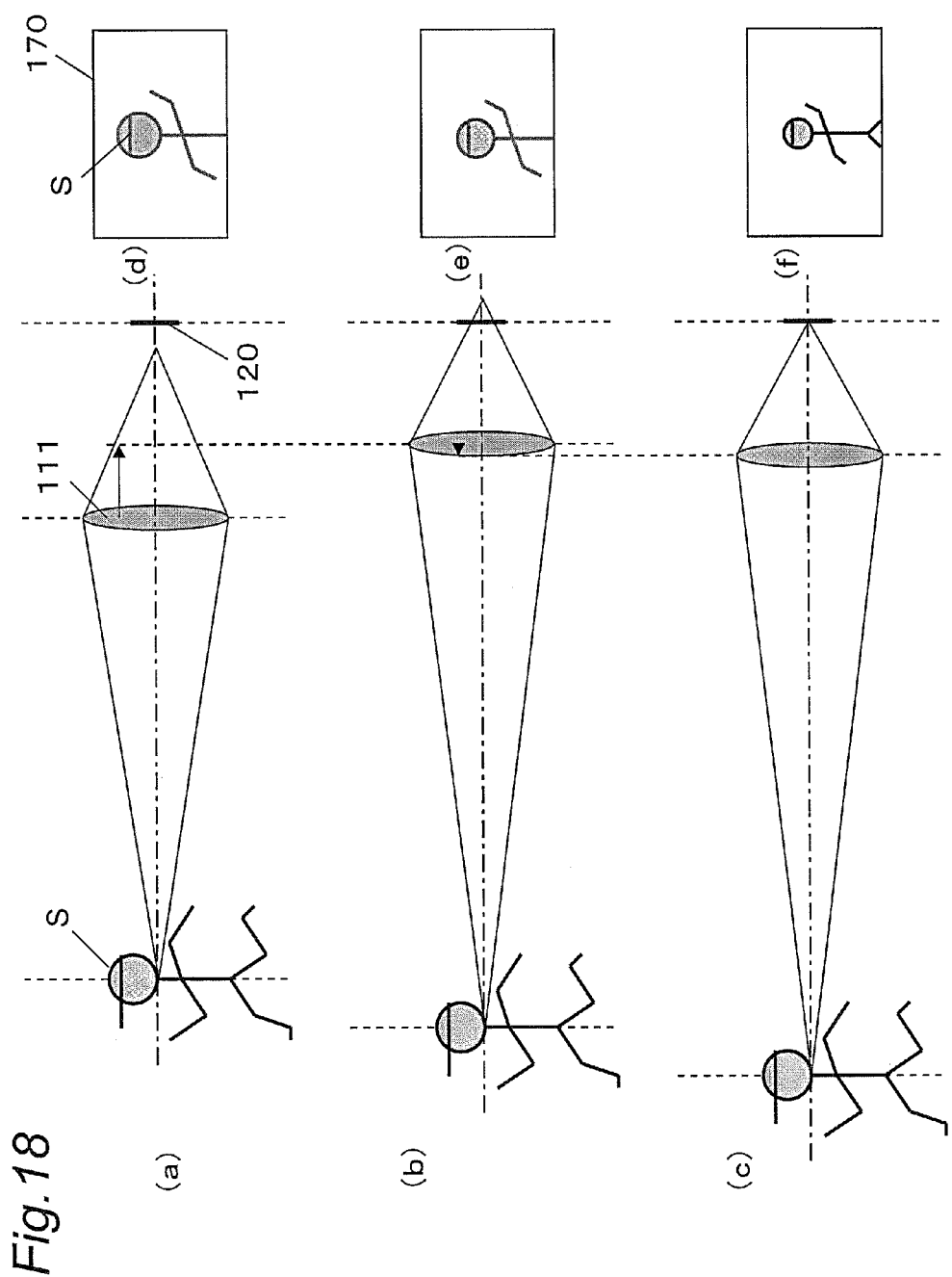
FIGS. 18(a) to 18(f) are principle diagrams of the moving subject tracking AF operation in the second embodiment (Subject: moving away from the camera, Initial Position: out-of-focus (closer side)).

FIG. 17 is a diagram for describing the operation of the moving subject tracking AF in the second embodiment corresponding to FIGS. 16(a) to 16(f) (Subject: moving away from the camera, Initial Position: out-of-focus (infinity side)). FIG. 17 shows AF evaluation values C0 to C7. Since the subject is moving away from the camera, the peak position of the AF evaluation value moves from the time T0 to the time T7. FIG. 17 shows positions P0 to P7 of the focus lens 111. The focus lens position P0 corresponds to the position of the focus lens 111 in FIG. 16(a). The focus lens position P4 corresponds to the position of the focus lens 111 in FIG. 16(b). The focus lens position P6 corresponds to the position of the focus lens 111 in FIG. 16(c).

FIGS. 18(a) to 18(f) are diagrams for describing the operation principle of the moving subject tracking AF in the second embodiment in a still different situation (Subject: moving away from the camera, Initial Position: out-of-focus (closer side)). Specifically, in FIGS. 18(a) to 18(f), it is assumed that the subject is moving away from the camera and the focus lens ill is at the closer side of the peak of the AF evaluation value in the out-of-focus state at the beginning of the AF operation. The subject S in FIGS. 18(a) to 18(f) is moving away from the camera 100 in the order of FIG. 18(a), FIG. 18(b), and FIG. 18(c).

Figure 19:
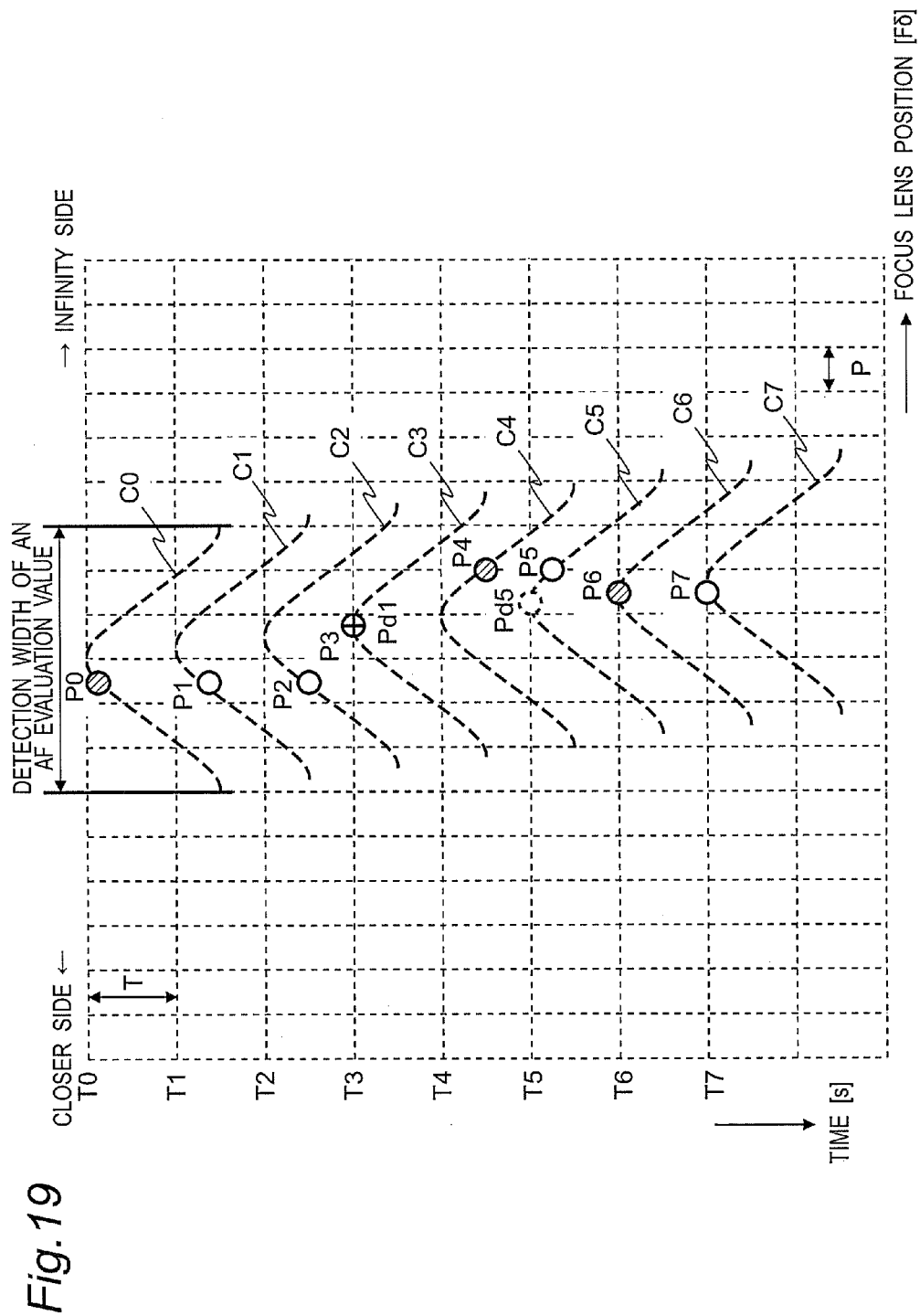
FIG. 19 is an explanatory diagram of the moving subject tracking AF operation in the second embodiment (Subject: moving away from the camera, Initial Position: out-of-focus (closer side)).

FIG. 19 is an explanatory diagram of the moving subject tracking AF operation in the second embodiment corresponding to FIGS. 18(a) to 18(f) (Subject: moving away from the camera, Initial Position: out-of-focus (closer side)). FIG. 19 shows AF evaluation values C0 to C7. Since the subject is moving away from the camera, the peak position of the AF evaluation value moves from the time T0 to the time T7.

FIG. 19 shows positions P0 to P7 of the focus lens 111. The focus lens position P0 corresponds to the position of the focus lens 111 in FIG. 18(a). The focus lens position P4 corresponds to the position of the focus lens 111 in FIG. 18(b). The focus lens position P6 corresponds to the position of the focus lens 111 in FIG. 18(c).

Here, each graduation on the time axis indicates $T=\frac{1}{30}$ [s]. The peak positions are indicated by the focus lens positions and each graduation on the focus lens position axis indicates $P=0.42$ [Fδ].

Figure 11A:
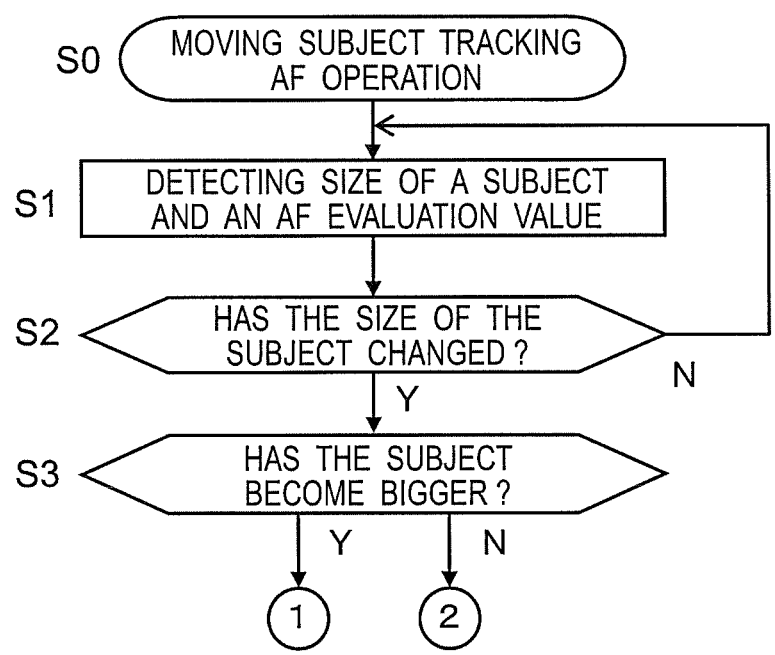
FIG. 11A is a flow chart of a moving subject tracking AF operation in the second embodiment.
Figure 11B:
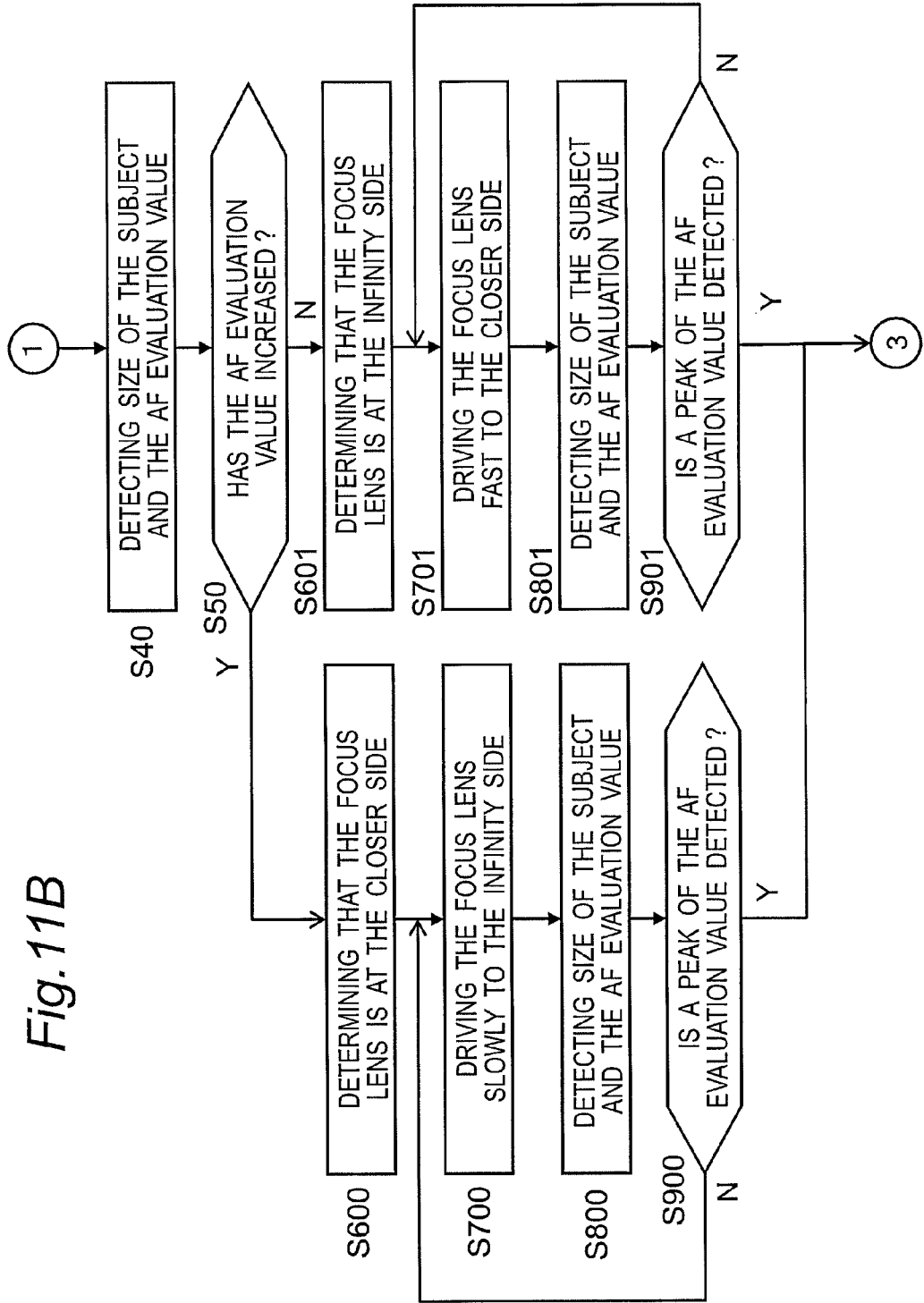
FIG. 11B is a flow chart of the moving subject tracking AF operation in the second embodiment.

Referring to FIG. 11A, in response to reception of the half-press operation on the release button 181 in the moving subject tracking AF control operation, the controller 150 starts the AF operation (S0). In the second embodiment, it is assumed that the moving subject tracking AF control operation is started when the subject is not in focus (the out-of-focus state). The AF operation starts at the time T0. At the time T0, when the controller 150 has stopped driving the focus lens 111, the controller 150 detects the size of the subject by using the segmentation while detecting the AF evaluation value with respect to the focus lens position P0. Next at the time T1, when the controller 150 has stopped driving the focus lens 111, the controller 150 detects the size of the subject by using the segmentation while detecting the AF evaluation value with respect to the focus lens position P1 (S1). Then, the controller 150 determines whether the size of the subject has changed or not by comparing the size of the subject at the focus lens position P0 with the size of the subject at the focus lens position P1 (S2). In the case where the size of the subject has changed, it can be determined that the subject has moved along the optical axis direction and thus the subject is not in focus. Accordingly, the focus lens 111 needs to be moved. For that reason, the operation proceeds to step S3. On the other hand, in the case where the size of the subject has not changed, it can be determined that the subject has not moved along the optical axis direction. Accordingly, since the focus lens 111 is not required to be moved, the operation returns to step S1.

Now, processes from step S3 onward will be described. In Step S3, the controller 150 determines whether the subject has become bigger. In the case where the subject has become bigger, the operation proceeds to step S40 (FIG. 11B), and in the case where it is determined that the subject has not become bigger (i.e., the subject has become smaller), the operation proceeds to step S41 (FIG. 11C).

A-1. Processes in the Case where the Subject has Become Bigger (the First Example)

Processes performed in the case where it is determined that the subject has become bigger (processes from step S40 onward in FIG. 11B and FIG. 11D) will be described with reference to FIGS. 12(a) to 12(f) and FIG. 13. FIGS. 12(a) to 12(f) illustrate a situation of the subject moving toward the camera in the order of FIG. 12(a), FIG. 12(b), and FIG. 12(c) with the lapse of time. Therefore, as illustrated in FIGS. 12(d) to 12(f), the subject displayed on the liquid crystal display 170 has become relatively bigger with the lapse of time. In that case, since it is determined that the size of the subject has changed in step S2 and it is determined that the size of the subject has become bigger in step S3, the operation proceeds to the process of step S40.

At the time T2, the controller 150 performs the process of step S40. In step S40, when the controller 150 has stopped driving the focus lens 111, the controller 150 detects the size of the subject by using the segmentation while detecting the AF evaluation value at the focus lens position P2 illustrated in FIG. 13. In step S1, when the controller 150 had stopped driving the focus lens 111, the controller 150 detected the AF evaluation values at the focus lens positions P0 and P1 illustrated in FIG. 13. Therefore, in step S50, the controller 150 determines whether the AF evaluation value at the focus lens position P2 has increased or not by comparing the AF evaluation value at the focus lens position P2 with the AF evaluation values previously detected at the focus lens positions P0 and P1.

In the example of FIG. 13, the AF evaluation value at the focus lens position P2 has become lower than the AF evaluation values previously detected at the focus lens positions P0 and P1. Therefore, in the flow chart shown in FIG. 11B, the operation proceeds from step S50 to step S601. At that moment, based on the determination results of steps S3 and S50, it is estimated that the peak position of the AF evaluation value C2 (i.e., the focus position) is at the closer side of the focus lens position P2. Therefore, the controller 150 determines that the focus lens 111 is at the infinity side of the peak of the AF evaluation value C2 (S601). That is, the controller 150 can determine that the position of the focus lens 111 is closer to the imaging plane than the peak position of the AF evaluation value is. In other words, the controller 150 can also determine that the focus position for the position of the focus lens 111 is behind the imaging plane.

Next in step S701, the controller 150 drives the focus lens 111 to the closer side (to the subject side) toward the peak of the AF evaluation value at a high speed to move the focus position to the subject side. In the example of FIG. 13, since the AF evaluation value decreases in the order of the focus lens positions P0, P1, and P2, it is estimated that the peak position of the AF evaluation value has moved away from the current position of the focus lens 111. Then, the controller 150 can promptly and accurately detect the peak position of the AF evaluation value by causing the focus lens 111 to be driven to the closer side at a relatively high speed.

Next at the time T3, the controller 150 performs the process of step S801. In the example shown here, the peak position of the AF evaluation value moves at the rate of 0.25 P/T from the infinity side to the closer side and the controller 150 causes the focus lens 111 to move at the rate of 1.25 P/T from the focus lens position P2 to P3 to P4 in the order. Therefore, the difference between the moving speed of the peak position of the AF evaluation value and the moving speed of the focus lens 111 is 1.0 P/T. With the difference between the moving speed of the peak position of the AF evaluation value and the moving speed of the focus lens 111 around 1.0 P/T, the controller 150 can ensure promptness and accuracy in searching the peak position of the AF evaluation value. Incidentally, it is assumed that the detection width of the AF evaluation value is 6 P here as illustrated in FIG. 13 (the same applies to the examples that follow).

In step S801, the controller 150 detects the size of the subject by using the segmentation while detecting the AF evaluation value at the focus lens position P3 by driving the focus lens 111 to the closer side at a relatively high speed.

Figure 11D:
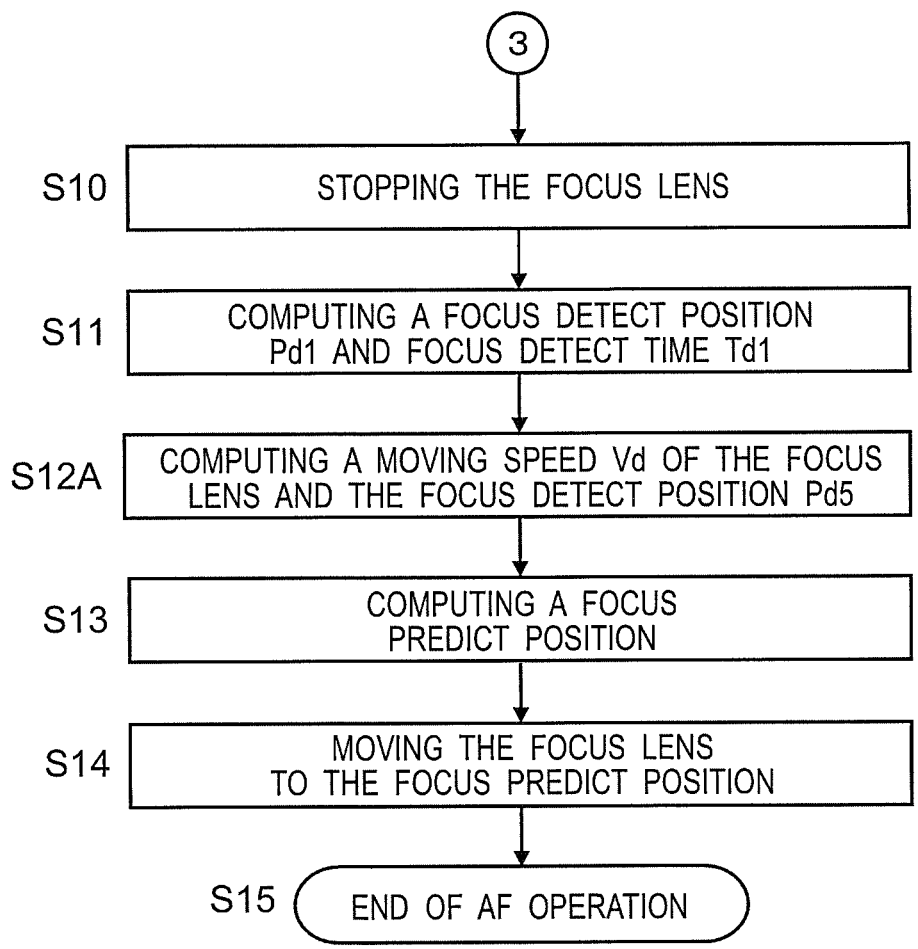
FIG. 11D is a flow chart of the moving subject tracking AF operation in the second embodiment.
Figure 12:
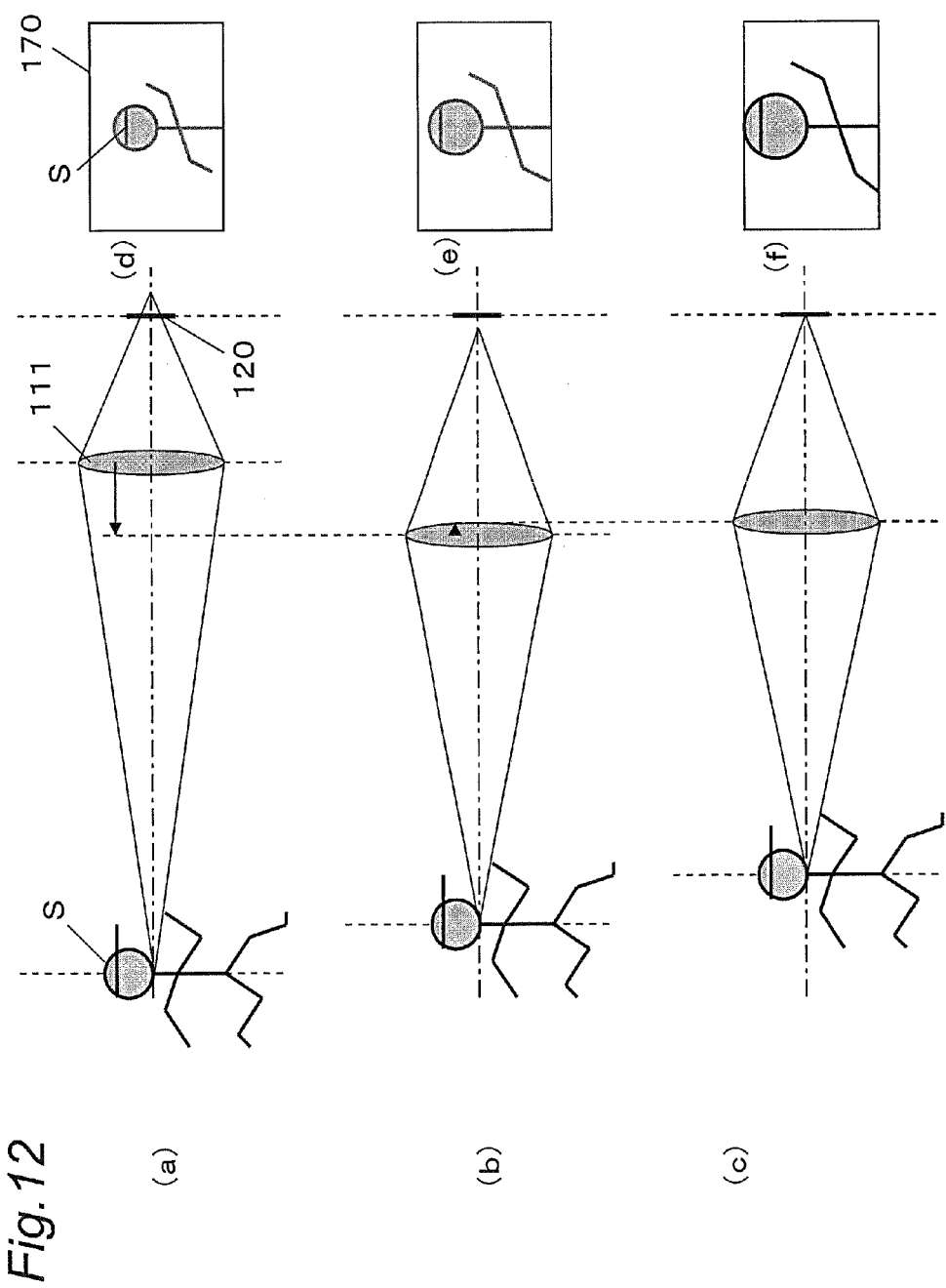
FIGS. 12(a) to 12(f) are principle diagrams of the moving subject tracking AF operation in the second embodiment (Subject: moving toward the camera, Initial Position: out-of-focus (infinity side)).

In step S901, the controller 150 determines whether the position of the focus lens 111 has passed the peak position of the AF evaluation value by comparing the AF evaluation values to that point of time. The controller 150 repeats the operation from step S701 to step S901 as far as it determines that the position of the focus lens 111 has not passed the peak position. At the time T4, the controller 150 detects the AF evaluation value (S801) and compares the AF evaluation values in the order of the focus lens positions P2, P3, and P4 (S901). As a result, since the controller 150 can determine that the position of the focus lens 111 has passed the peak position of the AF evaluation value, the controller 150 can determine that it has detected the peak position of the AF evaluation value. Then, the controller 150 stops the focus lens 111 at the time T5 (the focus lens position P5) (S10) (FIG. 11D).

Then in S11, the controller 150 computes the focus detect position Pd1 and the focus detect time Td1. With the AF evaluation values at the focus lens positions P0 to P4, the controller 150 can recognize that the focus lens position has passed the peak of the AF evaluation value in the movement from P2 to P3 to P4. In this example, since the AF evaluation values at the focus lens positions P2 and P4 are equal to each other and the AF evaluation value at the focus lens position P3 is higher than the values at the focus lens positions P2 and P4, the controller 150 can determine that the peak position is at the focus lens position P3. Further, the controller 150 can estimate that the peak of the AF evaluation value was detected at the time T3.

Therefore, the focus detect position Pd1 at which the AF evaluation value peaks can be shown by the expression below.

$$Pd1 = P3 = P0 - 1.25 \cdot P$$

The time Td1 at which the peak of the AF evaluation value was detected can be shown by the expression below.

$$Td1 = T3 = T0 + 3 \cdot T$$

Then in step S12A, the controller 150 computes the moving speed Vd of the focus lens 111 and the focus detect position Pd5. The focus detect position Pd5 is a predict position for the peak of the AF evaluation value at the time T5. In this embodiment, it is assumed that the moving subject tracking AF control operation is started when the subject is not in focus.

For calculating the moving speed Vd of the focus lens 111, the controller 150 needs the focus detect position Pd1 and the focus detect time Td1 represented by "+" in FIG. 13 and the focus detect position Pd5.

A method of calculating the focus detect position Pd5 will be described in detail with reference to FIGS. 20(a) to 20(c) and FIGS. 21(a) and 21(b). FIGS. 20(a) to 20(c) are diagrams for describing a computational algorithm for the focus position of the moving subject tracking AF in the second embodiment. FIGS. 21(a) and 21(b) are diagrams for describing a principle of segment range detection of the moving subject tracking AF in the second embodiment. FIG. 20(a) shows positional relationship between the subject, the focus lens 111, and the CCD image sensor 120 at the focus lens position P3 in FIG. 13. FIG. 20(a) shows the distance a0 between the subject and the focus lens 111 and the distance b0 between the focus lens 111 and the CCD image sensor 120. These kinds of information are recognized by the controller 150.

Now, it is assumed that the focus lens position has been drawn out toward the subject which is at the position shown in FIG. 20(a) so that the focus position is before the subject as illustrated in FIG. 20(b). FIG. 20(b) shows the distance a2 between the subject and the focus lens 111 and the distance b1 between the focus lens 111 and the CCD image sensor 120. Here, it is assumed that the focus lens position P5 in FIG. 13 is the position of the focus lens 111 for leaving the distance b1 between the focus lens 111 and the CCD image sensor 120. Under that condition, relationship a0+b0=a2+b1 holds and the distance a3 is left between the focus position at the subject side and the focus lens 111, and these kinds of information are recognized by the controller 150. The point in that case is that it is assumed that the focus lens position has been moved from P3 to P5 in FIG. 20(b).

Now, a method of computing the focus detect position Pd5 will be described. The focus detect position Pd5 indicates a predict position for the peak of the AF evaluation value C5 at the time T5. At the time T5, the focus lens 111 has already passed the focus position P3 (i.e., the position of FIG. 20(a)) at which the expression below holds (where f is the focal length).

$$1/f = 1/a0 + 1/b0$$

It is assumed that the focus lens position has moved from P3 to P5 in FIG. 20(b). Under that condition, the segment range h2 of the subject head can be expressed with the segment range h0 detected at the focus lens position P3 as the expression below.

$$h2 = h0 \times (b0 \cdot a0) / \{b1 \cdot (a0 + b0 - b1)\}$$

The ratio k2 of the segment range at that moment can be expressed as k2=h2/L. In the expression above, L indicates the range being captured and the ratio of the segment range indicates the ratio of the segment range to the captured range L. The segment range h3 of the subject head is detected at the focus lens position P5 and the ratio k3 of the segment range at that moment can be expressed as k3=h3/L.

But in reality, at the focus lens position P5, the subject has moved forward by La as illustrated in FIG. 20(c). As described above, since the ratio of the segment range has changed from k2 to k3 from FIG. 20(b) to FIG. 20(c), Δa can be calculated as below.

$$a2 = a0 + b0 - b1$$

$$a2 - \Delta a = (k2/k3) \cdot a2$$

Therefore, $\Delta a = (1 - k2/k3) \cdot (a0 + b0 - b1)$

Consequently, since the focus detect position Pd5 is calculated to be the position at which the focus lens 111 is drawn out by Δb from the focus lens position P3 based on the general equation $\Delta b = -(b0^2/a0^2) \cdot \Delta a$, the controller 150 can cause the subject which has moved toward the camera by Δa to be in focus by leaving the distance b2=b0+Δb between the focus lens 111 and the CCD image sensor 120 as illustrated in FIG. 20(c).

Although the segment range of the subject at the focus lens position P3 which the focus lens 111 has already passed is used in the above described case, respective segment ratios may be used by using the segment ranges of the subject detected at the focus lens positions P4 and P5. In that case, even the amount of drawing out the focus lens 111 Δb from the focus lens position P3 computed with the ratios at the focus lens positions P4 and P5 in place of k2 and k3 has just a slight margin of error. In other words, since the focus lens 111 has not passed the peak of the AF evaluation value so much at the focus lens positions P4 and P5, the margin of error is reduced to a slight value in the computation with the ratios at the focus lens positions P4 and P5. Besides, since the computation with the ratios at the focus lens positions P4 and P5 can give the amount of drawing out the focus lens 111 Δb without using the segment range of the subject at the focus position which the focus lens 111 has already passed, the computation has an advantage of simplifying the operation.

In step S12A, the controller 150 further calculates the moving speed Vd of the focus lens 111. The controller 150 can make the peak of the AF evaluation value agree with the focus lens position with respect to a moving subject by spending a time period (T5-Td1) in moving the focus lens from the focus detect position Pd1 to the focus detect position Pd5. Consequently, the moving speed Vd of the focus lens 111 for keeping the moving subject in focus (i.e., for causing the peak of the AF evaluation value to agree with the focus lens position) can be shown by the expression below.

$$Vd = (Pd5 - Pd1)/(T5 - Td1)$$
$$= -0.25 \cdot P/T$$

Subsequently in step S13, the controller 150 computes the focus predict position P6. The controller 150 can compute the amount of movement of the focus lens 111 from the moving speed Vd of the focus lens 111 for keeping the moving subject in focus and the elapsed time period T. The position P6 of the focus lens 111 for keeping the in-focus state at the time T6 can be computed from the focus lens position P0 at the time T0 using the expressions below.

$$P6 = Pd1 + Vd \cdot (T6 - Td1)$$
$$= Pd1 - 0.75 \cdot P$$

The focus lens position P5 at the time T5 can be shown by the expression below.

$$P5=Pd1-1.25 \cdot P$$

Based on the above expression, the amount of movement ΔP for moving the focus lens 111 from the focus lens position P5 at the time T5 to the focus predict position P6 at the time T6 when the time period T has passed from the time T5 can be shown by the expression below.

$$\Delta P=P6-P5=0.5 \cdot P$$

Then at the time T6, the controller 150 causes the focus lens 111 to move to the focus predict position P6 (S14) and finishes the AF operation (S15). That is, as a result of moving of the focus lens 111 from the focus lens position P5 by ΔP, the controller 150 can keep the moving subject in focus.

A-2. Processes in the Case where the Subject has Become Bigger (the Second Example)

Processes performed in the case where it is determined that the subject has become bigger (processes from step S40 onward in FIG. 11B and FIG. 11D) will be described with reference to FIGS. 14(a) to 14(f) and FIG. 15. FIGS. 14(a) to 14(f) illustrate a situation of the subject moving toward the camera in the order of FIG. 14(a), FIG. 14(b), and FIG. 14(c) with the lapse of time. Therefore, as illustrated in FIGS. 14(d) to 14(f), the subject displayed on the liquid crystal display 170 has become relatively bigger with the lapse of time. In that case, since it is determined that the size of the subject has changed in step S2 and it is determined that the size of the subject has become bigger in step S3, the operation is to proceed to the process of step S40.

At the time T2, the controller 150 performs the process of step S40. In step S40, when the controller 150 has stopped driving the focus lens 111, the controller 150 detects the size of the subject by using the segmentation while detecting the AF evaluation value at the focus lens position P2 illustrated in FIG. 15. In step S1, when the controller 150 had stopped driving the focus lens 111, the controller 150 detected the AF evaluation values at the focus lens positions P0 and P1 illustrated in FIG. 15. Therefore, in step S50, the controller 150 determines whether the AF evaluation value at the focus lens position P2 has increased or not by comparing the AF evaluation value at the focus lens position P2 with the AF evaluation values previously detected at the focus lens positions P0 and P1.

In the example of FIG. 15, the AF evaluation value at the focus lens position P2 has become higher than the AF evaluation values previously detected at the focus lens positions P0 and P1. Therefore, in the flow chart shown in FIG. 11B, the operation proceeds from step S50 to step S600. At that moment, based on the determination results of steps S3 and S50, it is estimated that the peak position of the AF evaluation value C2 (i.e., the focus position) is at the infinity side of the focus lens position P2. Therefore, in step S600, the controller 150 determines that the focus lens 111 is at the closer side of the peak of the AF evaluation value C2. That is, the controller 150 can determine that the position of the focus lens 111 is closer to the subject than the peak position of the AF evaluation value is. In other words, the controller 150 can also determine that the focus position for the position of the focus lens 111 is before the imaging plane.

Next in step S700, the controller 150 drives the focus lens 111 to the infinity side (to the imaging plane side) toward the peak of the AF evaluation value at a low speed to move the focus position to the imaging plane side. In the example of FIG. 15, since the AF evaluation value increases at the focus lens positions P0, P1, and P2 in the order, it is estimated that the peak position of the AF evaluation value has moved toward the current position of the focus lens 111. Then, the controller 150 can promptly and accurately detect the peak position of the AF evaluation value by causing the focus lens 111 to be driven to the infinity side at a relatively low speed.

Meanwhile, the expression "drive at a relatively low speed" means driving the focus lens 111 at a lower driving speed than a driving speed adopted in the case where the peak position of the AF evaluation value has moved away from the current position of the focus lens 111 (described above). In the example shown here, the peak position of the AF evaluation value moves at the rate of 0.25 P/T from the infinity side to the closer side and the controller 150 causes the focus lens 111 to move at the rate of 0.75 P/T from the focus lens position P2 to P3 to P4 in the order. Therefore, the difference between the moving speed of the peak position of the AF evaluation value and the moving speed of the focus lens 111 is 1.0 P/T. With the difference between the moving speed of the peak position of the AF evaluation value and the moving speed of the focus lens 111 around 1.0 P/T, the controller 150 can ensure promptness and accuracy in searching the peak position of the AF evaluation value.

Next at the time T3, the controller 150 performs the process of step S800. In step S800, the controller 150 detects the size of the subject by using the segmentation while detecting the AF evaluation value at the focus lens position P3 by driving the focus lens 111 to the infinity side at a relatively low speed.

In step S900, the controller 150 determines whether the position of the focus lens 111 has passed the peak position of the AF evaluation value by comparing the AF evaluation values to that point of time. The controller 150 repeats the operation from step S700 to step S900 as far as it determines that the position of the focus lens 111 has not passed the peak position. At the time T4, the controller 150 detects the AF evaluation value (S800) and compares the AF evaluation values in the order of the focus lens positions P2, P3, and P4 (S900). As a result, since the controller 150 can determine that the position of the focus lens 111 has passed the peak position of the AF evaluation value, the controller 150 can determine that it has detected the peak position of the AF evaluation value. Then, the controller 150 stops the focus lens 111 at the time T5 (the focus lens position P5) (S10 (FIG. 11D)).

Then in step S11, the controller 150 computes the focus detect position Pd1 and the focus detect time Td1. With the AF evaluation values at the focus lens positions P0 to P4, the controller 150 can recognize that the position of the focus lens 111 has passed the peak of the AF evaluation value in the movement from P2 to P3 to P4. In the example of FIG. 15, since the AF evaluation values at the focus lens positions P2 and P3 are equal to each other, the controller 150 can compute and conclude that the peak position is at an intermediate position between the focus lens positions P2 and P3. Further, since the AF evaluation value at the focus lens position P2 was detected at the time T2 and the AF evaluation value at the focus lens position P3 was detected at the time T3, the controller 150 can estimate that the peak of the AF evaluation value was detected between the time T2 and the time T3.

Therefore, the focus detect position Pd1 at which the AF evaluation value peaks can be shown by the expression below.

$$Pd1=(P2+P3)/2$$

In the example of FIG. 15, P2=P0. On the condition that the driving speed for "driving the focus lens 111 at a relatively low speed", i.e., the driving speed adopted in the case where the peak position of the AF evaluation value has moved toward the current position of the focus lens 111, is 0.75 P per 1 T, P3 is shown by the expression below.

$P3=P0+0.75P$

Therefore, Pd1 is shown by the expression below.

$Pd1=P0+0.375 \cdot P$

The time Td1 at which the peak of the AF evaluation value was detected can be shown by the expression below.

$Td1=(T2+T3)/2=T0+2.5 \cdot T$

Then in step S12A, the controller 150 computes the moving speed Vd of the focus lens 111 and the focus detect position Pd5. In this example, it is assumed that the moving subject tracking AF control operation is started when the subject is not in focus. For calculating the moving speed Vd of the focus lens 111, the controller 150 needs the focus detect position Pd1 and the focus detect time Td1 represented by "+" in FIG. 15 and the focus detect position Pd5. Since the method of computing the focus detect position Pd5 has been described in detail by specific example with reference to FIGS. 20(a) to 20(c) and FIGS. 21(a) and 21(b), the description of the method will be omitted. In this example, the segment range h2 of the subject head at the focus lens position P5 detected on the assumption that the focus lens position P5 at the time T5 agrees with an intermediate position Pd1 between the focus lens positions P2 and P3 can be shown by the expression below. In the expression below, h0 is an intermediate value of the segment ranges detected at the focus lens positions P2 and P3.

$h2=h0 \times (b0 \cdot a0)/\{b1 \cdot (a0+b0-b1)\}$

The ratio k2 of the segment range at that moment can be expressed as k2=h2/L. The segment range h3 of the subject head is detected at the focus lens position P5 and the ratio k3 of the segment range at that moment can be expressed as k3=h3/L.

Since the ratio of the segment range has changed from k2 to k3, it is estimated that the subject has moved forward by Δa. The above described Δa can be calculated by the expressions below.

$a2=a0+b0-b1$ $a2-\Delta a=(k2/k3) \cdot a2$

Therefore, $\Delta a=(1-k2/k3) \cdot (a0+b0-b1)$

Consequently, making the focus detect position Pd5 the position at which the focus lens 111 is drawn out from the focus detect position Pd1 by Δb based on the general equation $\Delta b=-(b0^2/a0^2) \cdot \Delta a$, the controller 150 can cause the subject moving toward the camera by Δa to be in focus.

Although the segment range of the subject at the focus detect position Pd1 which the focus lens 111 has already passed is used in the example above, respective segment ratios may be calculated based on the segment ranges of the subject detected at the focus lens positions P4 and P5. In that case, even the amount of drawing out the focus lens 111 Δb from the focus lens position P3 computed with the ratios at the focus lens positions P4 and P5 in place of k2 and k3 has just a slight margin of error. In other words, since the focus lens 111 has not passed the peak of the AF evaluation value so much at the focus lens positions P4 and P5, the margin of error is reduced to a slight value in the computation with the ratios at the focus lens positions P4 and P5. Besides, since the computation with the ratios at the focus lens positions P4 and P5 can give the amount of drawing out the focus lens 111 Δb without using the segment range of the subject at the focus position which the focus lens 111 has already passed, the computation has an advantage of simplifying the operation.

In step S12A, the controller 150 further calculates the moving speed Vd of the focus lens 111. The controller 150 can cause the peak of the AF evaluation value to agree with the focus lens position with respect to a moving subject by spending a time period (T5-Td1) in moving the focus lens 111 from the position Pd1 to the position Pd5. Consequently, the moving speed Vd of the focus lens 111 for keeping the moving subject in focus (i.e., for causing the peak of the AF evaluation value to agree with the focus lens position) can be shown by the expression below.

$Vd = (Pd5 - Pd1)/(T5 - Td1)$ $= -0.25 \cdot P/T$

Subsequently in step S13, the controller 150 computes the focus predict position P6. The controller 150 can compute the amount of movement of the focus lens 111 from the moving speed Vd of the focus lens 111 for keeping the moving subject in focus and the elapsed time period T. The position P6 of the focus lens 111 for keeping the in-focus state at the time T6 can be computed using the expressions below.

$P6 = Pd1 + Vd \cdot (T6 - Td1)$ $= Pd1 - 0.875 \cdot P$

The focus lens position P5 at the time T5 can be shown by the expression below.

$P5=Pd1+1.125 \cdot P$

Based on the above expression, the amount of movement ΔP for moving the focus lens 111 from the focus lens position P5 at the time T5 to the focus predict position P6 at the time T6 when the time period T has passed from the time T5 can be shown by the expression below.

$\Delta P=P6-P5=-2.0 \cdot P$

Then at the time T6, the controller 150 causes the focus lens 111 to move to the focus predict position P6 (S14) and finishes the AF operation (S15). That is, as a result of moving of the focus lens 111 from the focus lens position P5 by ΔP, the controller 150 can keep the moving subject in focus.

B-1. Processes in the Case where the Subject has Become Smaller (the First Example)

Processes performed in the case where it is determined that the subject has become smaller (processes from step S41 onward in FIG. 11C and FIG. 11D) will be described with reference to FIGS. 16(a) to 16(f) and FIG. 17. FIGS. 16(a) to 16(f) illustrate a situation of the subject moving away from the camera in the order of FIG. 16(a), FIG. 16(b), and FIG. 16(c) with the lapse of time. Therefore, as illustrated in FIGS. 16(d) to 16(f), the subject displayed on the liquid crystal display 170 has become relatively smaller with the lapse of time. In that case, since it is determined that the size of the subject has changed in step S2 and it is determined that the size of the subject has become smaller in step S3, the operation is to proceed to the process of step S41.

At the time T2, the controller 150 performs the process of step S41. In step S41, when the controller 150 has stopped driving the focus lens 111, the controller 150 detects the size of the subject by using the segmentation while detecting the AF evaluation value at the focus lens position P2 illustrated in FIG. 17. In step S1, when the controller 150 had stopped driving the focus lens 111, the controller 150 detected the AF evaluation values at the focus lens positions P0 and P1 illustrated in FIG. 17. Therefore, in step S51, the controller 150 determines whether the AF evaluation value at the focus lens position P2 has increased or not by comparing the AF evaluation value at the focus lens position P2 with the AF evaluation values previously detected at the focus lens positions P0 and P1.

In the example of FIG. 17, the AF evaluation value at the focus lens position P2 has become higher than the AF evaluation values previously detected at the focus lens positions P0 and P1. Therefore, in the flow chart shown in FIG. 11C, the operation proceeds from step S51 to step S611. At that moment, based on the determination results of steps S3 and S51, it is estimated that the peak position of the AF evaluation value C2 (i.e., the focus position) is at the closer side of the focus lens position P2. Therefore, in step S611, the controller 150 determines that the focus lens 111 is at the infinity side of the peak of the AF evaluation value C2. That is, the controller 150 can also determine that the position of the focus lens 111 is closer to the imaging plane than the peak position of the AF evaluation value is. In other words, the controller 150 can also determine that the focus position for the position of the focus lens 111 is behind the imaging plane.

Next in step S711, the controller 150 drives the focus lens 111 to the closer side toward the peak of the AF evaluation value. In the example of FIG. 17, since the AF evaluation value increases at the focus lens positions P0, P1, and P2 in the order, it is estimated that the peak position of the AF evaluation value has moved toward the current position of the focus lens 111.

Then, the controller 150 can promptly and accurately detect the peak position of the AF evaluation value by causing the focus lens 111 to be driven to the closer side (to the subject side) at a relatively low speed to move the focus position to the subject side. In the example shown here, the peak position of the AF evaluation value moves at the rate of 0.25 P/T from the closer side to the infinity side and the controller 150 causes the focus lens 111 to move at the rate of 0.75 P/T from the focus lens position P2 to P3 to P4 in the order.

Therefore, the difference between the moving speed of the peak position of the AF evaluation value and the moving speed of the focus lens 111 is 1.0 P/T. With the difference between the moving speed of the peak position of the AF evaluation value and the moving speed of the focus lens 111 around 1.0 P/T, the controller 150 can ensure promptness and accuracy in searching the peak position of the AF evaluation value.

Next at the time T3, the controller 150 performs the process of step S811. In step S811, the controller 150 detects the size of the subject by using the segmentation while detecting the AF evaluation value at the focus lens position P3 by driving the focus lens 111 to the closer side at a relatively low speed.

In step S911, the controller 150 determines whether the focus lens position has passed the peak position of the AF evaluation value by comparing the AF evaluation values to that point of time. The controller 150 repeats the operation from step S711 to step S911 as far as it determines that the focus lens position has not passed the peak position. At the time T4, the controller 150 detects the AF evaluation value (S811) and compares the AF evaluation values in the order of the focus lens positions P2, P3, and P4 (S911). Then, since the controller 150 can determine that the focus lens position has passed the peak position of the AF evaluation value, the controller 150 can determine that it has detected the peak position of the AF evaluation value and causes the operation to proceed to step S10 (FIG. 11D) at the time T5 to stop the focus lens 111 (the focus lens position P5).

Then in step S11, the controller 150 computes the focus detect position Pd1 and the focus detect time Td1. With the AF evaluation values at the focus lens positions P0 to P4, the controller 150 can recognize that the focus lens position has passed the peak of the AF evaluation value in the movement from P2 to P3 to P4. In the example of FIG. 17, since the AF evaluation values at the focus lens positions P2 and P3 are equal to each other, the controller 150 can compute and conclude that the peak position is at an intermediate position between the focus lens positions P2 and P3. Further, since the AF evaluation value at the focus lens position P2 was detected at the time T2 and the AF evaluation value at the focus lens position P3 was detected at the time T3, the controller 150 can estimate that the peak of the AF evaluation value was detected between the time T2 and the time T3.

Therefore, the focus detect position Pd1 at which the AF evaluation value peaks can be shown by the expression below.

$$Pd1=(P2+P3)/2=P0-0.375 \cdot P$$

The time Td1 at which the peak of the AF evaluation value was detected can be shown by the expression below.

$$Td1=(T2+T3)/2=T0+2.5 \cdot T$$

Then in step S12A, the controller 150 computes the moving speed Vd of the focus lens 111 and the focus detect position Pd5. In this example, it is assumed that the moving subject tracking AF control operation is started when the subject is not in focus. For calculating the moving speed Vd of the focus lens 111, the controller 150 needs the focus detect position Pd1 and the focus point detect time Td1 represented by "+" in FIG. 17 and the focus detect position Pd5. Since the method of calculating the focus detect position Pd5 has been described above, the description of the method will be omitted here. In this example, the segment range h2 of the subject head at the focus lens position P5 detected on the assumption that the focus lens position P5 at the time T5 is at the same position as that of an intermediate position Pd1 between the focus lens positions P2 and P3 can be shown by the expression below. In the expression below, h0 is an intermediate value of the segment ranges detected at the focus lens positions P2 and P3.

$$h2=h0 \times (b0 \cdot a0)/\{b1 \cdot (a0+b0-b1)\}$$

The ratio k2 of the segment range at that moment can be expressed as k2=h2/L. The segment range h3 of the subject head is detected at the focus lens position P5 and the ratio k3 of the segment range at that moment can be expressed as k3=h3/L.

Since the ratio of the segment range has changed from k2 to k3, it is estimated that the subject has moved forward by Δa. The above described Δa can be calculated by the expressions below.

$$a2 = a0 + b0 - b1$$

$$a2 - \Delta a = (k2/k3) \cdot a2$$

Therefore, $\Delta a = (1 - k2/k3) \cdot (a0 + b0 - b1)$

Consequently, making the focus detect position Pd5 the position at which the focus lens 111 is drawn out from the focus detect position Pd1 by Δb based on the general equation $\Delta b = -(b0^2/a0^2) \cdot \Delta a$, the controller 150 can cause the subject moving toward the camera by Δa to be in focus.

Although the segment range of the subject at the focus detect position Pd1 which the focus lens 111 has already passed is used in the example above, respective segment ratios may be calculated based on the segment ranges of the subject detected at the focus lens positions P4 and P5. In that case, even the amount of drawing out the focus lens 111 Δb from the focus lens position P3 computed with the ratios at the focus lens positions P4 and P5 in place of k2 and k3 has just a slight margin of error. In other words, since the focus lens 111 has not passed the peak of the AF evaluation value so much at the focus lens positions P4 and P5, the margin of error is reduced to a slight value in the computation with the ratios at the focus lens positions P4 and P5. Besides, since the computation with the ratios at the focus lens positions P4 and P5 can give the amount of drawing out the focus lens 111 Δb without using the segment range of the subject at the focus position which the focus lens 111 has already passed, the computation has an advantage of simplifying the operation.

In step S12A, the controller 150 further calculates the moving speed Vd of the focus lens 111. The controller 150 can cause the peak of the AF evaluation value to agree with the focus lens position with respect to a moving subject by spending a time period (T5−Td1) in moving the focus lens from the position Pd1 to the position Pd5. Consequently, the moving speed Vd of the focus lens 111 for keeping the moving subject in focus (i.e., for causing the peak of the AF evaluation value to agree with the focus lens position) can be shown by the expression below.

$$Vd = (Pd5 - Pd1)/(T5 - Td1) = 0.25 \cdot P/T$$

Subsequently in step S13, the controller 150 computes the focus predict position P6. The controller 150 can compute the amount of movement of the focus lens 111 from the moving speed Vd of the focus lens 111 for keeping the moving subject in focus and the elapsed time period T. The position P6 of the focus lens 111 for keeping the in-focus state at the time T6 can be computed using the expressions below.

$$P6 = Pd1 + Vd \cdot (T6 - Td1)$$
$$= Pd1 - 0.875 \cdot P$$

The focus lens position P5 at the time T5 can be shown by the expression below.

$$P5 = Pd1 - 1.125 \cdot P$$

Based on the above expression, the amount of movement ΔP for moving the focus lens 111 from the focus lens position P5 at the time T5 to the focus predict position P6 at the time T6 when the time period T has passed from the time T5 can be shown by the expression below.

$$\Delta P = P6 - P5 = 2.0 \cdot P$$

Then at the time T6, the controller 150 causes the focus lens 111 to move to the focus predict position P6 (S14) and finishes the AF operation (S15). That is, as a result of moving of the focus lens 111 from the focus lens position P5 by ΔP, the controller 150 can keep the moving subject in focus.

B-2. Processes in the Case where the Subject has Become Smaller (the Second Example)

Now, processes of another kind performed in the case where it is determined that the subject has become smaller (processes from step S41 onward in FIG. 11C and FIG. 11D) will be described with reference to FIGS. 18(a) to 18(f) and FIG. 19. FIGS. 18(a) to 18(f) illustrate a situation of the subject moving away from the camera in the order of FIG. 18(a), FIG. 18(b), and FIG. 18(c) with the lapse of time. Therefore, as illustrated in FIGS. 18(d) to 18(f), the subject displayed on the liquid crystal display 170 has become relatively small with the lapse of time. In that case, since it is determined that the size of the subject has changed in step S2 and it is determined that the size of the subject has become smaller in step S3, the operation is to proceed to the process of step S41.

At the time T2, the controller 150 performs the process of step S41. In step S41, when the controller 150 has stopped driving the focus lens 111, the controller 150 detects the size of the subject by using the segmentation while detecting the AF evaluation value at the focus lens position P2 illustrated in FIG. 19. In step S1, when the controller 150 had stopped driving the focus lens 111, the controller 150 detected the AF evaluation values at the focus lens positions P0 and P1 illustrated in FIG. 19. Therefore, in step S51, the controller 150 determines whether the AF evaluation value at the focus lens position P2 has increased or not by comparing the AF evaluation value at the focus lens position P2 with the AF evaluation values previously detected at the focus lens positions P0 and P1.

In the example of FIG. 19, the AF evaluation value at the focus lens position P2 has become lower than the AF evaluation values previously detected at the focus lens positions P0 and P1. Therefore, in the flow chart shown in FIG. 11C, the operation proceeds from step S51 to step S610. At that moment, based on the determination results of steps S3 and S51, it is estimated that the peak position of the AF evaluation value C2 (i.e., the focus position) is at the infinity side of the focus lens position P2. Therefore, in step S610, the controller 150 determines that the focus lens 111 is at the closer side of the peak of the AF evaluation value C2. That is, the controller 150 can also determine that the position of the focus lens 111 is closer to the subject than the peak position of the AF evaluation value is. In other words, the controller 150 can also determine that the focus position for the position of the focus lens 111 is before the imaging plane.

Next in step S710, the controller 150 drives the focus lens 111 to the infinity side toward the peak of the AF evaluation value. In the example of FIG. 19, since the AF evaluation value decreases in the order of the focus lens positions P0, P1, and P2, it is estimated that the peak position of the AF evaluation value has moved away from the current position of the focus lens 111.

Then, the controller 150 causes the focus lens 111 to be driven to the infinity side (to the imaging plane side) at a relatively high speed to move the focus position to the imaging plane side. As a result, the controller 150 can promptly and accurately detect the peak position of the AF evaluation value. In the example shown here, the peak position of the AF evaluation value moves at the rate of 0.25

P/T from the closer side to the infinity side and the controller 150 causes the focus lens 111 to move at the rate of 1.25 P/T from the focus lens position P2 to P3 to P4 in the order.

Therefore, the difference between the moving speed of the peak position of the AF evaluation value and the moving speed of the focus lens 111 is 1.0 P/T. With the difference between the moving speed of the peak position of the AF evaluation value and the moving speed of the focus lens 111 around 1.0 P/T, the controller 150 can ensure promptness and accuracy in searching the peak position of the AF evaluation value.

Next at the time T3, the controller 150 performs the process of step S810. In step S810, the controller 150 detects the size of the subject by using the segmentation while detecting the AF evaluation value from the focus lens position P3 onward by driving the focus lens 111 to the infinity side at a relatively high speed.

In step S910, the controller 150 determines whether the focus lens position has passed the peak position of the AF evaluation value by comparing the AF evaluation values to that point of time. The controller 150 repeats the operation from step S710 to step S910 as far as it determines that the focus lens position has not passed the peak position. At the time T4, the controller 150 detects the AF evaluation value (S810) and compares the AF evaluation values in the order of the focus lens positions P2, P3, and P4 (S910). Then, since the controller 150 can determine that the focus lens position has passed the peak position of the AF evaluation value, the controller 150 can determine that it has detected the peak position of the AF evaluation value and causes the operation to proceed to step S10 (FIG. 11D) at the time T5 to stop the focus lens 111 (the focus lens position P5).

Then in step S11, the controller 150 computes the focus detect position Pd1 and the focus detect time Td1. With the AF evaluation values at the focus lens positions P0 to P4, the controller 150 can recognize that the focus lens position has passed the peak of the AF evaluation value in the movement from P2 to P3 to P4. In the example of FIG. 19, the AF evaluation values at the focus lens positions P2 and P4 are equal to each other and the AF evaluation value at the focus lens position P3 is higher than the AF evaluation values at the focus lens positions P2 and P4. Therefore, the controller 150 can compute and conclude that the peak position is at the focus lens position P3. Further, the controller 150 can estimate that the peak of the AF evaluation value was detected at the time T3.

Therefore, the focus detect position Pd1 at which the AF evaluation value peaks can be shown by the expression below.

$$Pd1 = P3 = P0 + 1.25 \cdot P$$

The time Td1 at which the peak of the AF evaluation value was detected can be shown by the expression below.

$$Td1 = T3 = T0 + 3.0 \cdot T$$

Then in step S12A, the controller 150 computes the moving speed Vd of the focus lens 111 and the focus detect position Pd5. In this example, it is assumed that the moving subject tracking AF control operation is started when the subject is not in focus. For calculating the moving speed Vd of the focus lens 111, the controller 150 needs the focus detect position Pd1 and the focus detect time Td1 represented by "+" in FIG. 19 and the focus detect position Pd5. Since the method of calculating the focus detect position Pd5 has been described above, the description of the method will be omitted here. In this example, the segment range h2 of the subject head on the assumption that the focus lens position P5 at the time T5 is equal to the focus lens position P3 can be shown by the expression below. In the expression below, h0 is the segment range detected at the focus lens position P3.

$$h2 = h0 \times (b0 \cdot a0) / \{b1 \cdot (a0 + b0 - b1)\}$$

The ratio k2 of the segment range at that moment can be expressed as k2=h2/L. The segment range h3 of the subject head is detected at the focus lens position P5 and the ratio k3 of the segment range at that moment can be expressed as k3=h3/L.

Since the ratio of the segment range has changed from k2 to k3, it is estimated that the subject has moved forward by Δa. The above described Δa can be calculated by the expressions below.

$$a2 = a0 + b0 - b1$$

$$a2 - \Delta a = (k2/k3) \cdot a2$$

$$\text{Therefore,} \Delta a = (1 - k2/k3) \cdot (a0 + b0 - b1)$$

Consequently, making the focus detect position Pd5 the position at which the focus lens 111 is drawn out from the focus detect position Pd1 by Δb based on the general equation $\Delta b = -(b0^2/a0^2) \cdot \Delta a$, the controller 150 can cause the subject moving toward the camera by Δa to be in focus.

Although the segment range of the subject at the focus detect position Pd1 which the focus lens 111 has already passed is used in the example above, respective segment ratios may be calculated based on the segment ranges of the subject detected at the focus lens positions P4 and P5. In that case, even the amount of drawing out the focus lens 111 Δb from the focus lens position P3 computed with the ratios at the focus lens positions P4 and P5 in place of k2 and k3 has just a slight margin of error. In other words, since the focus lens 111 has not passed the peak of the AF evaluation value so much at the focus lens positions P4 and P5, the margin of error is reduced to a slight value in the computation with the ratios at the focus lens positions P4 and P5. Besides, since the computation with the ratios at the focus lens positions P4 and P5 can give the amount of drawing out the focus lens 111 Δb without using the segment range of the subject at the focus position which the focus lens 111 has already passed, the computation has an advantage of simplifying the operation.

In step S12A, the controller 150 further calculates the moving speed Vd of the focus lens 111. The controller 150 can cause the peak of the AF evaluation value to agree with the focus lens position with respect to a moving subject by spending a time period (T5-Td1) in moving the focus lens from the position Pd1 to the position Pd5. Consequently, the moving speed Vd of the focus lens 111 for keeping the moving subject in focus (i.e., for causing the peak of the AF evaluation value to agree with the focus lens position) can be shown by the expression below.

$$Vd = (Pd5 - Pd1)/(T5 - Td1) = 0.25 \cdot P/T$$

Then in step S13, the controller 150 computes the focus predict position P6. The controller 150 can compute the amount of movement of the focus lens 111 from the moving speed Vd of the focus lens 111 for keeping the moving subject in focus and the elapsed time period T. The position P6 of the focus lens 111 for keeping the in-focus state at the time T6 can be computed using the expressions below.

$$P6 = Pd1 + Vd \cdot (T6 - Td1)$$
$$= Pd1 - 0.75 \cdot P$$

The focus lens position P5 at the time T5 can be shown by the expression below.

$$P5 = Pd1 + 1.25 \cdot P$$

Based on the above expression, the amount of movement ΔP for moving the focus lens 111 from the focus lens position P5 at the time T5 to the focus predict position P6 at the time T6 when the time period T has passed from the time T5 can be shown by the expression below.

$$\Delta P = P6 - P5 = -0.5 \cdot P$$

Then at the time T6, the controller 150 causes the focus lens 111 to move to the focus predict position P6 and finishes the AF operation (S15). That is, as a result of moving of the focus lens 111 from the focus lens position P5 by ΔP, the controller 150 can keep the moving subject in focus.

3. Other Embodiments

As described above, the first and second embodiments have been discussed as examples of the technology disclosed in the present application. However, the technology in the present disclosure is not limited to these embodiments and may also be applied to embodiments which have been subjected to modifications, substitutions, additions, or omissions as required. In addition, the respective constituent elements described in the first and second embodiments may be combined to make a new embodiment.

Then, other embodiments will be described below as examples.

In the above described embodiments, it is assumed that the moving subject tracking AF control operation starts in response to the user's half-pressing on the release button 181 as an example. However, the auto-focusing device is not limited to that and may be configured to start the moving subject tracking AF control operation before the user half-presses the release button 181 (always-on). Alternatively, the auto-focusing device may be configured to detect a change in size or position of the subject by using the segmentation and enter the moving subject tracking AF control operation mode in response to the detection. Still alternatively, the auto-focusing device may be configured to enter the moving subject tracking AF control operation mode in response to the detection of change in brightness or color of the subject or the detection of camera shake. Still alternatively, the auto-focusing device may be configured to automatically enter the moving subject tracking AF control operation mode whether the mode is the continuous AF control operation mode or the single AF control operation mode.

Although it is assumed that the unit time period T=1/30 [s] in the above described embodiments, the unit time period may be shorter such as T=1/60, 1/120, 1/240 [s]. With a still shorter unit time period, the accuracy in predicting the track of the subject for the moving subject AF is further improved.

Although the focus lens is described as a convex lens in the above described embodiments, the focus lens may be constituted of a concave lens and used in combination with the other convex lenses. In that case, the driving direction is opposite to the driving direction of the focus lens constituted of a convex lens described in the above embodiments.

Further, in the above described embodiments, the auto-focusing device performs drive control to move the focus lens 111 to the focus position for the subject moving toward or away from the digital camera 100 by using the position of the focus lens 111 and the rate of change of the size of the subject image in the moving subject tracking AF control operation using the AF evaluation value (movement determination result). At that moment, in a case where the controller 150 has detected that the focus lens position has passed the peak of the AF evaluation value while the controller 150 is moving the focus lens 111 according to determination that the moving direction of the subject and the moving direction of the focus position corresponding to the position of the focus lens ill are the same, the controller 150 may drive the focus lens 111 by inverting the driving direction for movement and stop the focus lens 111 after the focus lens 111 passing the position at which the peak of the AF evaluation value was previously detected.

On the other hand, in a case where the controller 150 has detected that the focus lens position has passed the peak of the AF evaluation value while the controller 150 is moving the focus lens 111 according to determination that the moving direction of the subject and the moving direction of the focus position corresponding to the position of the focus lens 111 are opposite to each other, the controller 150 may drive the focus lens 111 by inverting the driving direction for movement and stop the focus lens 111 before the position at which the peak of the AF evaluation value was previously detected. With that drive control on the focus lens 111, the controller 150 can perform accurate drive control on the focus lens 111 to move the focus lens 111 to the focus position for the subject moving toward or away from the digital camera 100.

Although the imaging unit has been exemplified by the CCD image sensor, the imaging unit is not limited to that. For example, the imaging unit may be other types of image sensor including a CMOS image sensor.

The technical idea shown in the above described embodiments is not limited to be applied to the digital camera but can be widely applied to image pickup devices equipped with auto-focusing devices such as a movie camera and a camera-equipped mobile phone.

4. Summarization

The auto-focusing device according to the above described embodiments has a CCD image sensor 120 configured to generate image data by capturing a subject image formed on an imaging plane; an optical system 110 which includes a focus lens 111 and is configured to form the subject image on the imaging plane; a focus lens motor 113 configured to drive the focus lens 111 along an optical axis direction; and a controller 150 configured to perform various types of control. The controller 150 is configured to detect the position of the focus lens 111. The controller 150 is configured to detect a predetermined region of the subject image in the image data and calculate an AF evaluation value from the image data. The controller 150 is configured to determine whether a subject is moving closer or away from the auto-focusing device based on whether the detected predetermined region has been enlarged or reduced from the predetermined region detected before. The controller 150 is configured to control the focus lens motor 113. The controller 150 is configured to control a moving direction and a moving speed of the focus lens 111 in an autofocus operation based on a determination result on whether the subject is moving closer or away from the auto-focusing device, the AF evaluation value, and the position detection result for the focus lens.

Further, in a case where the controller 150 has determined that the peak position which is a position of the focus lens at which the AF evaluation value peaks has moved away from the position of the focus lens 111 based on the determination result on whether the subject is moving closer or away from the auto-focusing device (movement determination result) and the AF evaluation value (NO in S3), the controller 150 moves the focus lens 111 toward the peak position at a first speed (S710). On the other hand, in a case where the controller 150 has determined that the peak position has moved toward the position of the focus lens 111 (YES in S3), the controller 150 moves the focus lens 111 toward the peak position at a second speed which is lower than the first speed (S711).

In a case where the controller 150 has determined that the subject is moving away from the auto-focusing device (NO in S3) and then determined that the position of the focus lens 111 is closer to the imaging plane than a peak position is based on the determination result and the AF evaluation value, the controller 150 moves the focus lens toward the subject at a first speed (S711), the peak position being a position of the focus lens 111 at which the AF evaluation value peaks. On the other hand, in a case where the controller 150 has determined that the position of the focus lens 111 is closer to the subject than the peak position is, the controller 150 moves the focus lens 111 toward the imaging plane at a second speed which is higher than the first speed. (S710).

Further, in a case where the controller 150 has determined that the subject is moving closer to the auto-focusing device (YES in S3) and then determined that the position of the focus lens is closer to the subject than a peak position is based on the movement determination result and the AF evaluation value, the controller 150 moves the focus lens toward the imaging plane at a first speed (S700), the peak position being a position of the focus lens at which the AF evaluation value peaks. On the other hand, in a case where the controller 150 has determined that the position of the focus lens 111 is closer to the imaging plane than the peak position is, the controller 150 moves the focus lens 111 toward the subject at a second speed which is higher than the first speed (S701).

Further, in a case where the controller 150 has determined that the subject is moving away from the auto-focusing device (NO in S3) and then determined that a focus position corresponding to the position of the focus lens 111 is behind the imaging plane, the controller 150 moves the focus lens at a first speed to move the focus position toward the subject (S711). On the other hand, in a case where the controller 150 has determined that the focus position corresponding to the position of the focus lens 111 is before the imaging plane, the controller 150 moves the focus lens 111 at a second speed which is higher than the first speed to move the focus position toward the imaging plane (S710).

Further, in a case where the controller 150 has determined that the subject is moving closer to the auto-focusing device (YES in S3) and then determined that a focus position corresponding to the position of the focus lens is before the imaging plane, the controller 150 moves the focus lens at a first speed to move the focus position toward the imaging plane (S700). On the other hand, in a case where the controller 150 has determined that the focus position corresponding to the position of the focus lens is behind the imaging plane, the controller 150 moves the focus lens at a second speed which is higher than the first speed to move the focus position toward the subject (S701).

Further, in a case where the AF evaluation value has become smaller than a previous value while driving of the focus lens 111 is stopped (NO in S50) and it is determined that the subject is moving closer to the auto-focusing device (YES in S3), the controller 150 moves the focus lens 111 toward the subject at a first speed (S701). On the other hand, in a case where the AF evaluation value has become bigger than a previous value while driving of the focus lens 111 is stopped (YES in S50) and it is determined that the subject is moving closer to the auto-focusing device (YES in S3), the controller 150 moves the focus lens 111 toward the imaging plane at a second speed which is lower than the first speed (S700).

Further, in a case where the AF evaluation value has become smaller than a previous value while driving of the focus lens 111 is stopped (NO in S51) and it is determined that the subject is moving away from the auto-focusing device (NO in S3), the controller 150 moves the focus lens 111 toward the imaging plane at a first speed (S710). On the other hand, in a case where the AF evaluation value has become bigger than a previous value while driving of the focus lens is stopped (YES in S51) and it is determined that the subject is moving away from the auto-focusing device (NO in S3), the controller 150 moves the focus lens ill toward the subject at a second speed which is lower than the first speed (S711).

Further, in a case where the AF evaluation value has become smaller than a previous value while driving of the focus lens is stopped (NO in S50) and the controller 150 has determined that the subject is moving closes to the auto-focusing device (YES in S3), the controller 150 moves the focus lens ill at a first speed to move the focus position of the focus lens 111 toward the subject (S701). On the other hand, in a case where the AF evaluation value has become bigger than a previous value while driving of the focus lens 111 is stopped (YES in S50) and the controller 150 has determined that the subject is moving closer to the auto-focusing device (YES in S3), the controller 150 moves the focus lens at a second speed which is lower than the first speed to move the focus position of the focus lens 111 toward the imaging plane (S700).

Further, in a case where the AF evaluation value has become smaller than a previous value while driving of the focus lens 111 is stopped (NO in S51) and the controller 150 has determined that the subject is moving away from the auto-focusing device (NO in S3), the controller 150 moves the focus lens at a first speed to move the focus position of the focus lens 111 toward the imaging plane (S710). On the other hand, in a case where the AF evaluation value has become bigger than a previous value while driving of the focus lens 111 is stopped (YES in S51) and the controller 150 has determined that the subject is moving away from the auto-focusing device (NO in S3), the controller 150 moves the focus lens at a second speed which is lower than the first speed to move the focus position of the focus lens 111 toward the subject (S711).

In a case where the controller 150 has detected that the focus lens position has passed the peak of the AF evaluation value while the controller 150 is moving the focus lens 111 according to determination that the moving direction of the subject and the moving direction of the focus position corresponding to the position of the focus lens are the same made on the basis of the movement determination result and positional relationship between the focus position corresponding to the focus lens position and the imaging plane, the controller 150 drives the focus lens by inverting a driving direction for movement and stops the focus lens after the focus lens passing the position at which the peak of the AF evaluation value is detected.

In a case where the controller 150 has detected that the focus lens position has passed the peak position while the controller 150 is moving the focus lens 111 according to determination that the moving direction of the subject and the moving direction of the focus position corresponding to the focus lens position are opposite to each other made on the basis of the movement determination result and positional relationship between the focus position corresponding to the position of the focus lens 111 and the imaging plane, the controller 150 drives the focus lens by inverting a driving direction for movement and stops the focus lens before the position at which the peak of the AF evaluation value is detected.

As described above, the auto-focusing device according to the present disclosure can perform drive control to move the focus lens 111 to the focus position for a subject moving toward or away from the digital camera 100 by using the position of the focus lens 111 and the rate of change of the subject image size in the moving subject tracking AF control operation using the AF evaluation value. In the case where the peak position of the AF evaluation value representing the focus position of the subject image has moved closer to the focus lens 111 based on the current position of the focus lens 111, the controller 150 causes the focus lens ill to be slowly driven to the peak position of the AF evaluation value. On the other hand, in the case where the peak position of the AF evaluation value has moved away from the current position of the focus lens 111, the controller 150 causes the focus lens 111 to be driven to the peak position of the AF evaluation value at a high speed. With that configuration, the auto-focusing device according to the present disclosure is able to promptly search the peak position of the AF evaluation value representing the focus position of the subject image and is also able to improve accuracy in computing the peak position of the AF evaluation value.

Further, the auto-focusing device according to the present disclosure can perform drive control to move the focus lens 111 to the focus position for a subject moving toward or away from the digital camera 100 by using the position of the focus lens 111 and the rate of change of the subject image size in the moving subject tracking AF control operation using the AF evaluation value even in the case where the subject is out of focus. Here, the auto-focusing device according to the present disclosure can predict the focus position with a slight margin of error by detecting the rate of change of the subject image size even in the out-of-focus state.

Also, the auto-focusing device according to the present disclosure can perform drive control to move the focus lens 111 to the focus position for a subject moving toward or away from the digital camera 100 by using the position of the focus lens ill and the rate of change of the subject image size (movement determination result) in the moving subject tracking AF control operation using the AF evaluation value. In a case where the auto-focusing device has detected that the focus lens position has passed the peak of the AF evaluation value while the auto-focusing device is moving the focus lens 111 according to determination that the moving direction of the subject and the moving direction of the focus position corresponding to the position of the focus lens 111 are the same, the auto-focusing device drives the focus lens 111 by inverting the driving direction for movement and stops the focus lens 111 after the focus lens 111 passing the position at which the peak of the AF evaluation value was previously detected.

On the other hand, in a case where the auto-focusing device has detected that the position of the focus lens 111 has passed the peak of the AF evaluation value while the auto-focusing device is moving the focus lens 111 according to determination that the moving direction of the subject and the moving direction of the focus position corresponding to the position of the focus lens 111 are opposite to each other, the auto-focusing device drives the focus lens 111 by inverting the driving direction for movement and stops the focus lens 111 before the position at which the peak of the AF evaluation value was previously detected. With that drive control on the focus lens 111, the auto-focusing device can perform accurate drive control on the focus lens 111 to move the focus lens 111 to the focus position for the subject moving toward or away from the digital camera 100.

The auto-focusing device according to the present disclosure is installed in the digital camera. With that configuration, the present disclosure can provide a digital camera equipped with the auto-focusing device which enables satisfactory image taking by automatically preventing the user from taking a subject image in an out-of-focus state.

The embodiments have been described above as examples of the technology of the present disclosure. For that purpose, the attached drawings and the detailed description have been provided.

Therefore, the constituent elements shown or described in the attached drawings and the detailed description may include not only the constituent element necessary to solve the problem but also the constituent element unnecessary to solve the problem in order to exemplify the technology. Accordingly, it should not be instantly understood that the unnecessary constituent element is necessary since the unnecessary constituent element is shown or described in the attached drawings and the detailed description.

Also, since the above described embodiments are for exemplifying the technology of the present disclosure, the embodiments may be subjected to various kinds of modification, substitution, addition, omission, or the like without departing from the scope of the claims and their equivalents.

The present disclosure is applicable to image pickup devices equipped with auto-focusing devices such as digital cameras, movie cameras, and camera-equipped mobile phones.

What is claimed is:

1. An auto-focusing device comprising:
    an image sensor unit configured to generate image data by capturing a subject image formed on an imaging plane;
    an optical system which includes a focus lens and is configured to form the subject image on the imaging plane;
    a lens driver configured to drive the focus lens along an optical axis direction;
    a lens position detector configured to detect a position of the focus lens;
    a region detector configured to detect a predetermined region of the subject image in the image data;
    a processor configured to:
        calculate an AF evaluation value from the image data; and
        determine whether a subject is moving closer or away based on whether the predetermined region detected by the region detector has been enlarged or reduced from the predetermined region detected before; and
    a lens controller configured to control the lens driver, wherein
        the lens controller controls a moving direction and a moving speed of the focus lens in an autofocus operation based on the determination result provided from the processor, the AF evaluation value provided by the processor, and a position detection result for the focus lens provided by the lens position detector, and the lens controller changes the moving direction of the focus lens in the autofocus operation based on the determination result provided from the processor regarding whether the predetermined region detected by the region detector has been enlarged or reduced from the predetermined region detected before.

2. The auto-focusing device according to claim 1, wherein the lens controller moves the focus lens toward the peak position at a first speed in a case where the lens controller has determined that a peak position has moved away from the position of the focus lens based on the determination result provided from the processor and the AF evaluation value provided from the processor, the peak position being a position of the focus lens at which the AF evaluation value peaks, and moves the focus lens toward the peak position at a second speed which is lower than the first speed in a case where the lens controller has determined that the peak position has moved toward the position of the focus lens.

3. The auto-focusing device according to claim 1, wherein, in a case where the processor has determined that the subject is moving away, the lens controller moves the focus lens toward the subject at a first speed in a case where the lens controller has determined that the position of the focus lens is closer to the imaging plane than a peak position is based on the determination result provided from the processor and the AF evaluation value provided from the processor, the peak position being a position of the focus lens at which the AF evaluation value peaks, and moves the focus lens toward the imaging plane at a second speed which is higher than the first speed in a case where the lens controller has determined that the position of the focus lens is closer to the subject than the peak position is.

4. The auto-focusing device according to claim 1, wherein, in a case where the processor has determined that the subject is moving closer, the lens controller moves the focus lens toward the imaging plane at a first speed in a case where the lens controller has determined that the position of the focus lens is closer to the subject than a peak position is based on the determination result provided from the processor and the AF evaluation value provided from the processor, the peak position being a position of the focus lens at which the AF evaluation value peaks, and moves the focus lens toward the subject at a second speed which is higher than the first speed in a case where the lens controller has determined that the position of the focus lens is closer to the imaging plane than the peak position is.

5. The auto-focusing device according to claim 1, wherein, in a case where the processor has determined that the subject is moving away, the lens controller moves the focus lens at a first speed to move the focus position toward the subject in a case where the lens controller has determined that a focus position corresponding to the position of the focus lens is behind the imaging plane, and moves the focus lens at a second speed which is higher than the first speed to move the focus position toward the imaging plane in a case where the lens controller has determined that the focus position corresponding to the position of the focus lens is before the imaging plane.

6. The auto-focusing device according to claim 1, wherein, in a case where the processor has determined that the subject is moving closer, the lens controller moves the focus lens at a first speed to move the focus position toward the imaging plane in a case where the lens controller has determined that a focus position corresponding to the position of the focus lens is before the imaging plane, and moves the focus lens at a second speed which is higher than the first speed to move the focus position toward the subject in a case where the lens controller has determined that the focus position corresponding to the position of the focus lens is behind the imaging plane.

7. The auto-focusing device according to claim 1, wherein the lens controller moves the focus lens toward the subject at a first speed in a case where the AF evaluation value which is output from the processor has become smaller than a previous value while driving of the focus lens is stopped and the processor has determined that the subject is moving closer, and moves the focus lens toward the imaging plane at a second speed which is lower than the first speed in a case where the AF evaluation value which is output from the processor has become bigger than a previous value while driving of the focus lens is stopped and the processor has determined that the subject is moving closer.

8. The auto-focusing device according to claim 1, wherein the lens controller moves the focus lens toward the imaging plane at a first speed in a case where the AF evaluation value which is output from the processor has become smaller than a previous value while driving of the focus lens is stopped and the processor has determined that the subject is moving away, and moves the focus lens toward the subject at a second speed which is lower than the first speed in a case where the AF evaluation value which is output from the processor has become bigger than a previous value while driving of the focus lens is stopped and the processor has determined that the subject is moving away.

9. The auto-focusing device according to claim 1, wherein the lens controller moves the focus lens at a first speed to move the focus position of the focus lens toward the subject in a case where the AF evaluation value which is output from the processor has become smaller than a previous value while driving of the focus lens is stopped and the processor has determined that the subject is moving closer, and moves the focus lens at a second speed which is lower than the first speed to move the focus position of the focus lens toward the imaging plane in a case where the AF evaluation value which is output from the processor has become bigger than a previous value while driving of the focus lens is stopped and the processor has determined that the subject is moving closer.

10. The auto-focusing device according to claim 1, wherein the lens controller moves the focus lens at a first speed to move the focus position of the focus lens toward the imaging plane in a case where the AF evaluation value which is output from the processor has become smaller than a previous value while driving of the focus lens is stopped and the processor has determined that the subject is moving away, and moves the focus lens at a second speed which is lower than the first speed to move the focus position of the focus lens toward the subject in a case where the AF evaluation value which is output from the processor has become bigger than a previous value while driving of the focus lens is stopped and the processor has determined that the subject is moving away.

11. The auto-focusing device according to claim 1, wherein, in a case where the lens controller has detected that the position of the focus lens has passed a peak of the AF evaluation value which is output from the processor while the lens controller is moving the focus lens according to determination that the moving direction of the subject and the moving direction of the focus position corresponding to the position of the focus lens are the same made on the basis of the determination result provided from the processor and positional relationship between the focus position corresponding to the position of the focus lens and the imaging plane, the lens controller drives the focus lens by inverting a driving direction for movement and stops the focus lens after the focus lens passing the position at which the peak of the AF evaluation value is detected.

12. The auto-focusing device according to claim 1, wherein, in a case where the lens controller has detected that the position of the focus lens has passed the peak position while the lens controller is moving the focus lens according to determination that the moving direction of the subject and the moving direction of the focus position corresponding to the position of the focus lens are opposite to each other made on the basis of the determination result provided from the processor and positional relationship between the focus position corresponding to the position of the focus lens and the imaging plane, the lens controller drives the focus lens by inverting a driving direction for movement and stops the focus lens before the position at which the peak of the AF evaluation value is detected.

13. An image pickup device equipped with the auto-focusing device according to claim 1.

* * * * *